US011558495B2

(12) United States Patent
Coverstone et al.

(10) Patent No.: US 11,558,495 B2
(45) Date of Patent: Jan. 17, 2023

(54) SYSTEMS AND METHODS FOR CHARGING A MOBILE PHONE AND A MOBILE PHONE COVER

(71) Applicant: STAR CO Scientific Technologies Advanced Research Co, LLC, Longview, TX (US)

(72) Inventors: Thomas E. Coverstone, Longview, TX (US); Jason Montgomery, Longview, TX (US)

(73) Assignee: STAR CO Scientific Technologies Advanced Research Co, Longview, TX (US)

(*) Notice: Subject to any disclaimer, the term of this patent is extended or adjusted under 35 U.S.C. 154(b) by 388 days.

(21) Appl. No.: 16/884,663

(22) Filed: May 27, 2020

(65) Prior Publication Data

US 2020/0288000 A1 Sep. 10, 2020

Related U.S. Application Data

(63) Continuation-in-part of application No. 15/973,144, filed on May 7, 2018.

(51) Int. Cl.
*H04M 1/02* (2006.01)
*H02J 7/00* (2006.01)
*G06F 1/16* (2006.01)

(52) U.S. Cl.
CPC .......... *H04M 1/026* (2013.01); *G06F 1/1632* (2013.01); *H02J 7/00034* (2020.01); *H02J 7/0047* (2013.01)

(58) Field of Classification Search
CPC ............ H02J 50/00; H02J 50/05; H02J 50/10; H04W 52/0296; H04W 52/00; H04W 52/0209
See application file for complete search history.

(56) References Cited

U.S. PATENT DOCUMENTS

| | | | |
|---|---|---|---|
| 6,608,996 B1 | 8/2003 | Laurikka | |
| 6,611,697 B1 | 8/2003 | Ewing | |
| 7,065,381 B2 | 6/2006 | Jenkins et al. | |
| 7,305,260 B2 | 12/2007 | Vuor | |
| 7,353,416 B2 | 4/2008 | Jeansonne et al. | |
| 7,400,917 B2 | 7/2008 | Wood et al. | |
| 7,466,810 B1 | 12/2008 | Quon et al. | |
| 7,769,141 B2 | 8/2010 | Cupal et al. | |
| 7,941,725 B2 | 5/2011 | Francillon et al. | |

(Continued)

FOREIGN PATENT DOCUMENTS

| | | | |
|---|---|---|---|
| CN | 107317061 A | * 11/2017 | |
| GB | 2487095 | 7/2012 | |
| GB | 2487095 A | * 7/2012 | ............. G06F 1/263 |

OTHER PUBLICATIONS

Int'l Prelimiminary Report on Patentability Appln No. CT/US2019/030861 dated Nov. 19, 2020.

(Continued)

*Primary Examiner* — Matthew C Sams
(74) *Attorney, Agent, or Firm* — McAndrews, Held & Malloy, Ltd.

(57) ABSTRACT

A battery in a mobile phone cover may be selectively charged according to a user-selectable parameter. When charged, the battery in the mobile phone cover may be used to charge a battery in a mobile phone.

78 Claims, 14 Drawing Sheets

(56) References Cited

U.S. PATENT DOCUMENTS

| | | | |
|---|---|---|---|
| 8,055,312 B2* | 11/2011 | Shi | H04M 19/08 455/572 |
| 8,204,551 B2* | 6/2012 | Lee | G06F 1/1635 320/112 |
| 8,367,235 B2* | 2/2013 | Huang | G06F 1/1632 429/96 |
| 8,428,644 B1 | 4/2013 | Harooni | |
| 8,519,962 B2* | 8/2013 | Han | G06F 1/1683 345/169 |
| 8,583,198 B1 | 11/2013 | Coverstone | |
| 8,588,749 B1 | 11/2013 | Sadhvani | |
| 8,805,456 B1* | 8/2014 | Hardy | H02J 7/00034 455/573 |
| 8,954,117 B2 | 2/2015 | Huang | H04B 1/3883 455/572 |
| 9,300,347 B1 | 3/2016 | Coverstone | |
| 9,306,611 B2 | 4/2016 | Coverstone | |
| 9,426,266 B1 | 8/2016 | Coverstone | |
| 9,584,174 B1 | 2/2017 | Coverstone | |
| 9,674,325 B1 | 6/2017 | Coverstone | |
| 9,915,988 B2* | 3/2018 | Kashyap | G06F 1/1626 |
| 2004/0174430 A1 | 9/2004 | Sawahara | |
| 2005/0119032 A1 | 6/2005 | Airas | |
| 2005/0270872 A1 | 12/2005 | Lin | |
| 2006/0240877 A1 | 10/2006 | Filiba et al. | |
| 2009/0186264 A1* | 7/2009 | Huang | H04B 1/3888 429/96 |
| 2009/0231248 A1 | 9/2009 | Dorff et al. | |
| 2011/0039605 A1 | 2/2011 | Choi et al. | |
| 2012/0052929 A1 | 3/2012 | Khamvong | |
| 2012/0196580 A1 | 8/2012 | Simmons et al. | |
| 2012/0244848 A1* | 9/2012 | Ghaffari | H04M 1/04 455/415 |
| 2012/0302294 A1 | 11/2012 | Hammond et al. | |
| 2012/0329518 A1 | 12/2012 | Neerag | |
| 2013/0027364 A1 | 1/2013 | Kim | |
| 2013/0260825 A1 | 10/2013 | Hagenstad | |
| 2014/0045558 A1* | 2/2014 | Kim | H04M 1/21 455/575.1 |
| 2014/0117921 A1* | 5/2014 | Suomela | H02J 7/00036 320/103 |
| 2014/0120883 A1 | 5/2014 | Rondeau et al. | |
| 2014/0141838 A1* | 5/2014 | Cai | H04M 1/0254 455/557 |
| 2014/0183962 A1* | 7/2014 | Qian | H02J 50/12 307/104 |
| 2014/0184143 A1* | 7/2014 | Coakley | G06F 3/0202 320/107 |
| 2015/0295446 A1* | 10/2015 | Fathollahi | H04M 1/0274 455/573 |
| 2016/0226266 A1* | 8/2016 | Huang | H02J 7/0068 |
| 2017/0007840 A1 | 1/2017 | Benson | |
| 2017/0083068 A1* | 3/2017 | Kashyap | G06F 1/26 |
| 2018/0062687 A1* | 3/2018 | Jeon | H02J 7/0047 |

OTHER PUBLICATIONS

European Office Communication with extended European Search Report Appln No. 19799698.6 dated Apr. 22, 2022.

Int'l Searh Report and the Written Opinion Appln No. PCT/US2019/030861 dated Jul. 16, 2019.

* cited by examiner

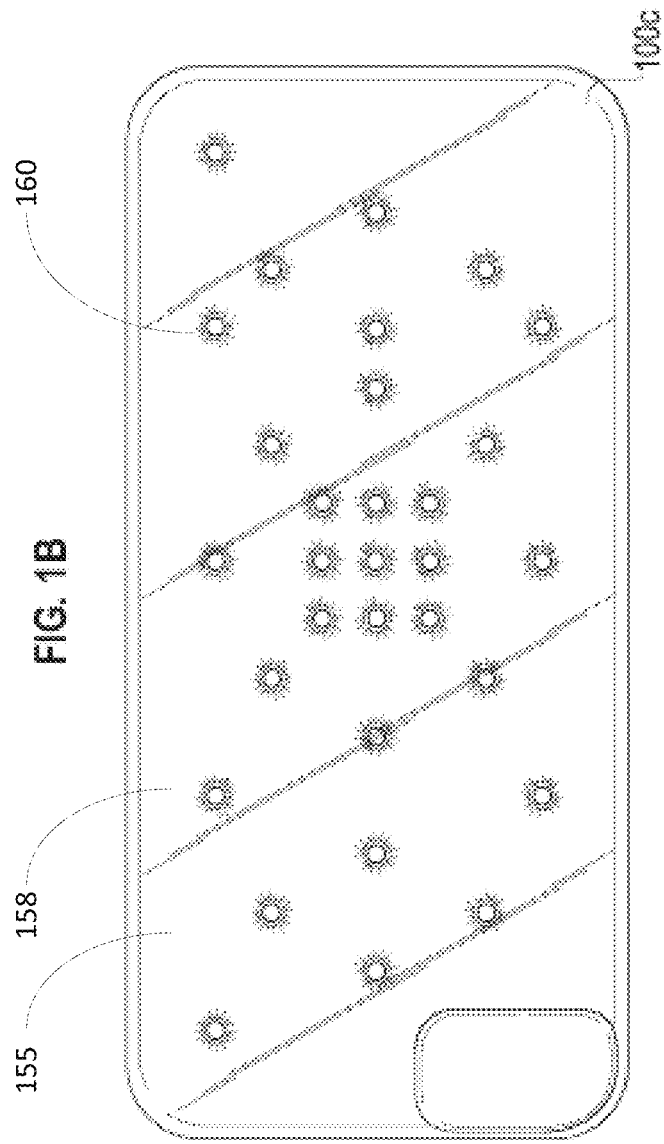

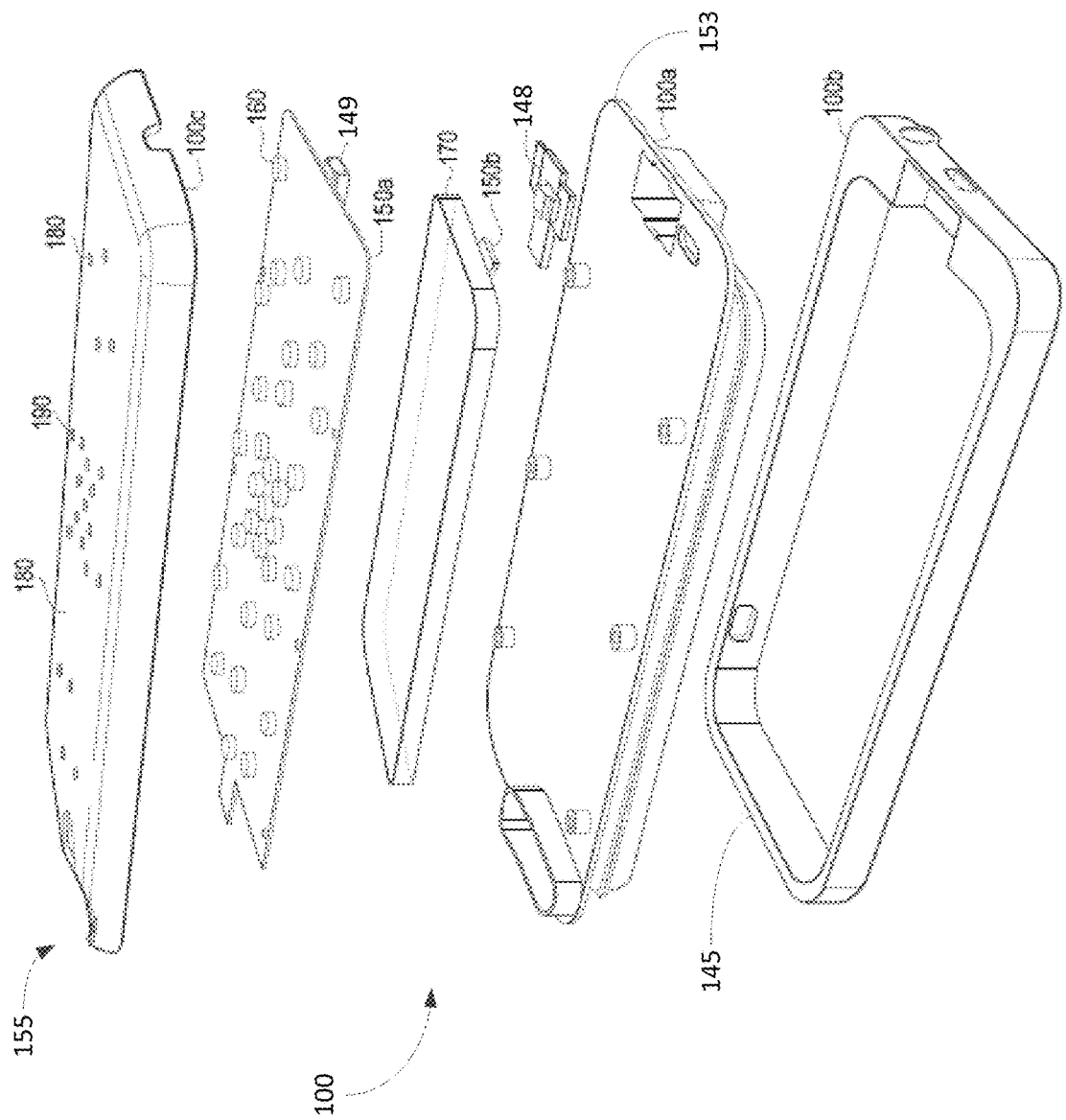

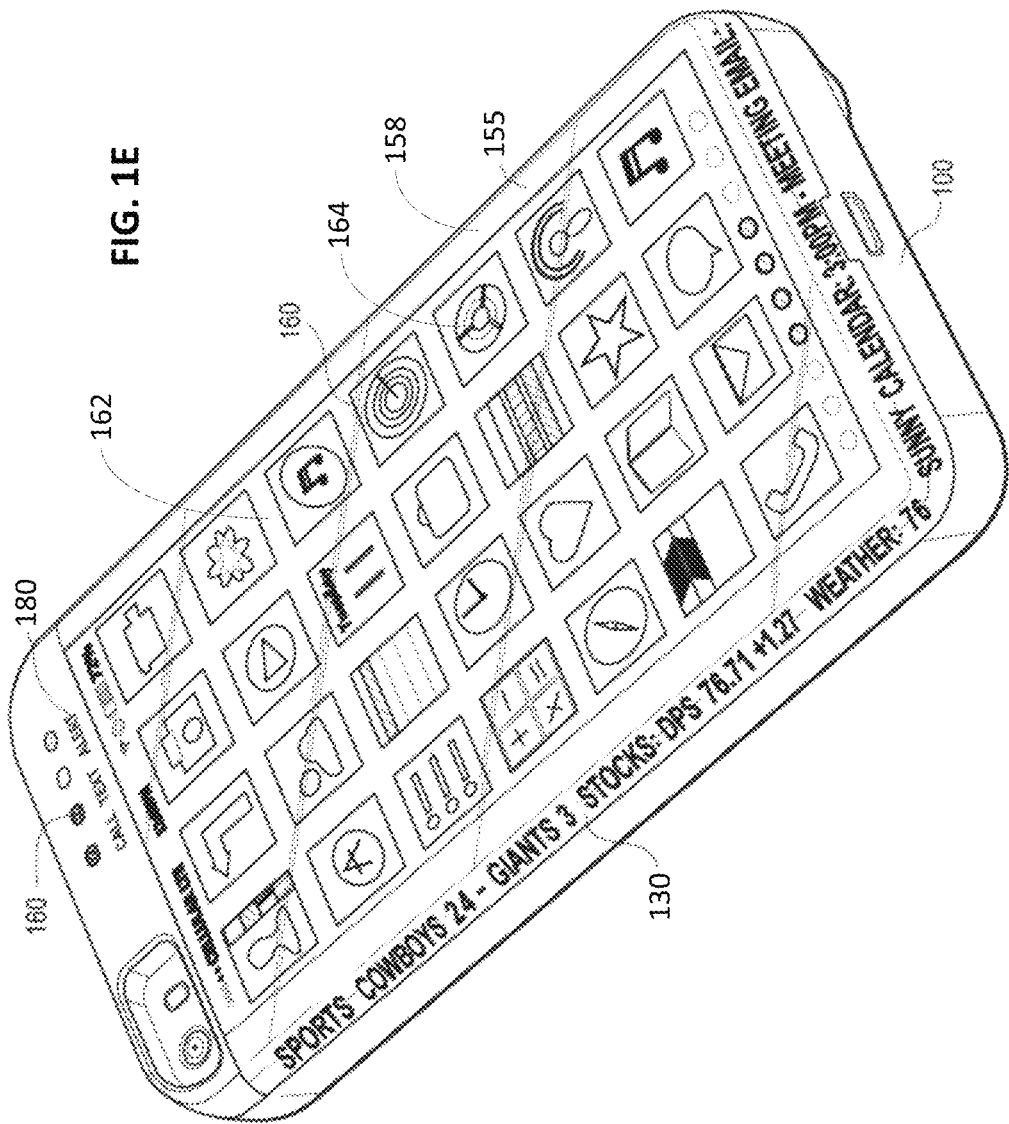

SYSTEMS AND METHODS FOR CHARGING A MOBILE PHONE AND A MOBILE PHONE COVER

CROSS-REFERENCE TO RELATED APPLICATIONS/INCORPORATION BY REFERENCE

This patent application is a continuation-in-part of U.S. application Ser. No. 15/973,144 filed May 7, 2018 the contents of which are hereby incorporated herein by reference in their entirety.

FIELD OF THE DISCLOSURE

Certain embodiments of the disclosure relate to systems and methods for charging a mobile phone and a mobile phone cover.

BACKGROUND OF THE DISCLOSURE

Conventional mobile phone covers are passive accessories to mobile phones. They can have static designs and can offer some measure of protection for the mobile phone.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Some embodiments according to the present disclosure relate to, for example, an active cover for an electronic device or equipment as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1B shows a top view of an exemplary embodiment of the mobile device cover according to the present disclosure.

FIG. 1D shows an exploded side perspective view of an exemplary embodiment of the mobile device cover according to the present disclosure.

FIG. 1E shows an exemplary embodiment of the mobile device cover according to the present disclosure.

DETAILED DESCRIPTION OF THE DISCLOSURE

Figure 1A:
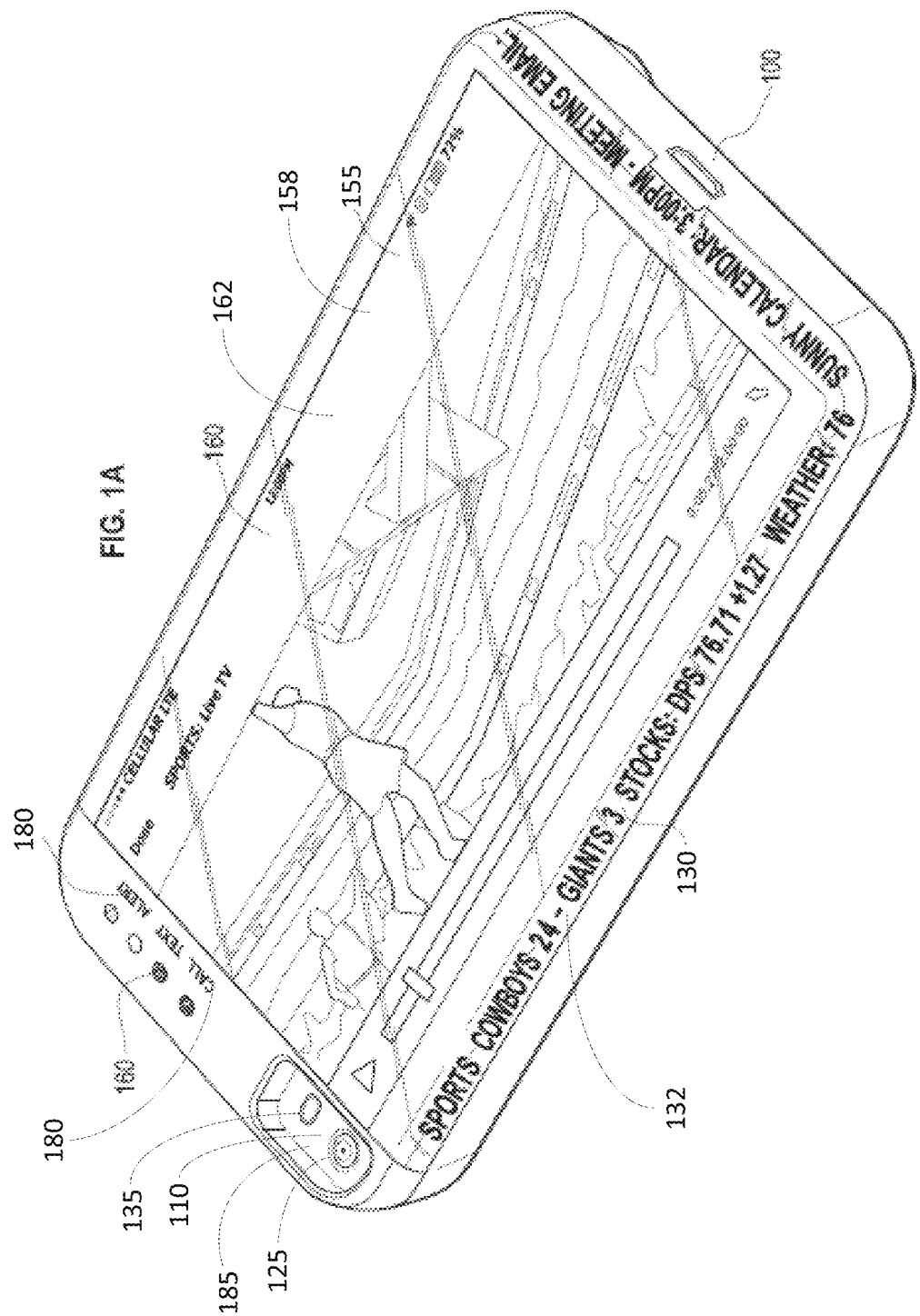
FIG. 1A shows an exemplary embodiment of a mobile device cover according to the present disclosure.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of or provide one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

The drawings are of illustrative embodiments. They do not illustrate all embodiments. Other embodiments may be used in addition to or instead of the illustrative embodiments. Details that may be apparent or unnecessary may be omitted to save space or for more effective illustration. Some embodiments may be practiced with additional components or steps and/or without all of the components or steps that are illustrated.

Some embodiments according to the present disclosure provide, for example, suitable logic, circuitry, code, and/or combinations thereof that may be adapted to perform the functions or acts described herein.

Some embodiments according to the present disclosure may relate to, for example, systems and methods that provide an active cover for an electronic device or equipment. Some embodiments contemplate that the active cover and the electronic device or equipment can communicate (e.g., digitally communicate) with each other. Some embodiments contemplate that the active cover and the electronic device or equipment can power themselves, for example, via direct current (DC) power supplies (e.g., rechargeable batteries) and/or via alternating current (AC) power supplies (e.g., wall outlets). Some embodiments further contemplate that one or both of the active cover and the electronic device or equipment can power and/or recharge the other.

Some embodiments according to the present disclosure provide that the active cover can sense when the electronic device is generating an alert or receiving a message, a notification, a call, an email, and/or an indication, and can provide an enhanced alert or indication (e.g., audible and/or visual alert or indication) instead of or in addition to the generated alert or indication of the electronic device. The active cover can provide a visual display (e.g., patterns of lights, animated icons, animated emojis, lightshows, scrolling text, video, etc.), display information (e.g., a message, a notification, and/or an indication) received from the electronic device on a graphical user interface (e.g., a touch-sensitive screen), generate a sound (e.g., voice, musical note, audible tone, etc.), and/or vibrate.

Some embodiments according to the present disclosure contemplate that the active cover includes a mobile device cover for use with, for example, a host mobile device (e.g., a cellular handset, a cellular device, a smartphone, a wireless phone, a wireless device, a wireless handset, a multimode phone, a mobile phone compliant with multiple wireless communication standards, a mobile phone equipped with a global positioning system, a multiple-input-multiple-output phone, a wireless communication device, a two-way radio, a communication device with one or more antennas, etc.). The systems and methods disclosed herein can also be used with, for example, tablets, tablet computers, laptops, computers, computing devices, and other devices as well. The systems and methods can be used with stationary devices such as, for example, desktop computers and stationary monitors and/or displays as well. Some embodiments according to the present disclosure that the functionality of the active cover can be directly implemented into the host mobile device, for example, as part of the housing of the host mobile device.

Some embodiments according to the present disclosure contemplate that, during a host mobile device alert or event, an active mobile device cover can provide its own alert or indication according to signals (e.g., alert signals, indication signals, data, digital signals, etc.) received from the host mobile device. The active mobile device cover may also light in a distinct or random pattern such as, for example, any arrangement, sequence, etc. using lights in which different colors, brightness, intensities, etc. form shapes, images, icons, emojis, text, alphanumeric text, video, messages, notifications, etc. that are either static or moving (e.g., animated), for example. The lights may be individual or distinct lighting devices or may be part of or form at least a portion of a screen or a display of the active mobile device cover. In some embodiments, the distinct or random patterns can be illuminated according to the sound, sound signal, alert data, digital signal, and/or other information generated by the host mobile device, and received by the active mobile device cover, for example. In some embodiments, a distinct pattern can be assigned (e.g., manually by a user or automatically) to an associated sound, sound signal, alert, alert signal, digital signal, caller, contact, notification, etc., and/or other information. For example, a distinct pattern can be assigned to a particular ring tone, ring tone signal, contact information (e.g., telephone number, email address, etc.), etc. A random pattern can be assigned to and/or associated with particular sounds, sound signals, alerts, alert signals, digital signals, callers, contacts, notifications, etc., and/or other information. For example, a random pattern or selected pattern can be assigned to a particular ring tone or ring tone signal of the host mobile device, or to a particular source (e.g., telephone number, caller ID, email address, IP address, etc.) of a message, email, call, etc. The random pattern can also be assigned to unassigned identifiers (e.g., telephone numbers, email addresses, IP addresses, source identifiers, etc.) or unrecognized and/or unknown identifiers. In addition to enhancing the look and feel of the outside of the host mobile device, the active mobile device cover provides the user with superior sensory input over the host mobile device alone, and/or protect the host mobile device from drops, scratches, etc.

Some embodiments according to the present disclosure provide a mobile device cover with lights such as light emitting diodes (LEDs) which can be part of and/or form different types of displays (e.g., organic LED (OLED) screens, RGB LED screens, LCD displays, LED indicator lights, touch-sensitive displays, screens, etc.), or other light sources or displays.

Some embodiments according to the present disclosure provide a mobile application that runs on a host mobile device. The mobile application provides a graphical user interface including one or more graphical elements that are used to control the mobile device cover and the host mobile device. In some embodiments, the mobile application provides a graphical user interface including one or more graphical elements that are used to control the charging of the battery of the mobile device cover by the battery of the host mobile device. In some embodiments, the mobile application provides a graphical user interface including one or more graphical elements that are used to control the charging of the battery of the host mobile device by the battery of the mobile device cover.

Figure 1C:
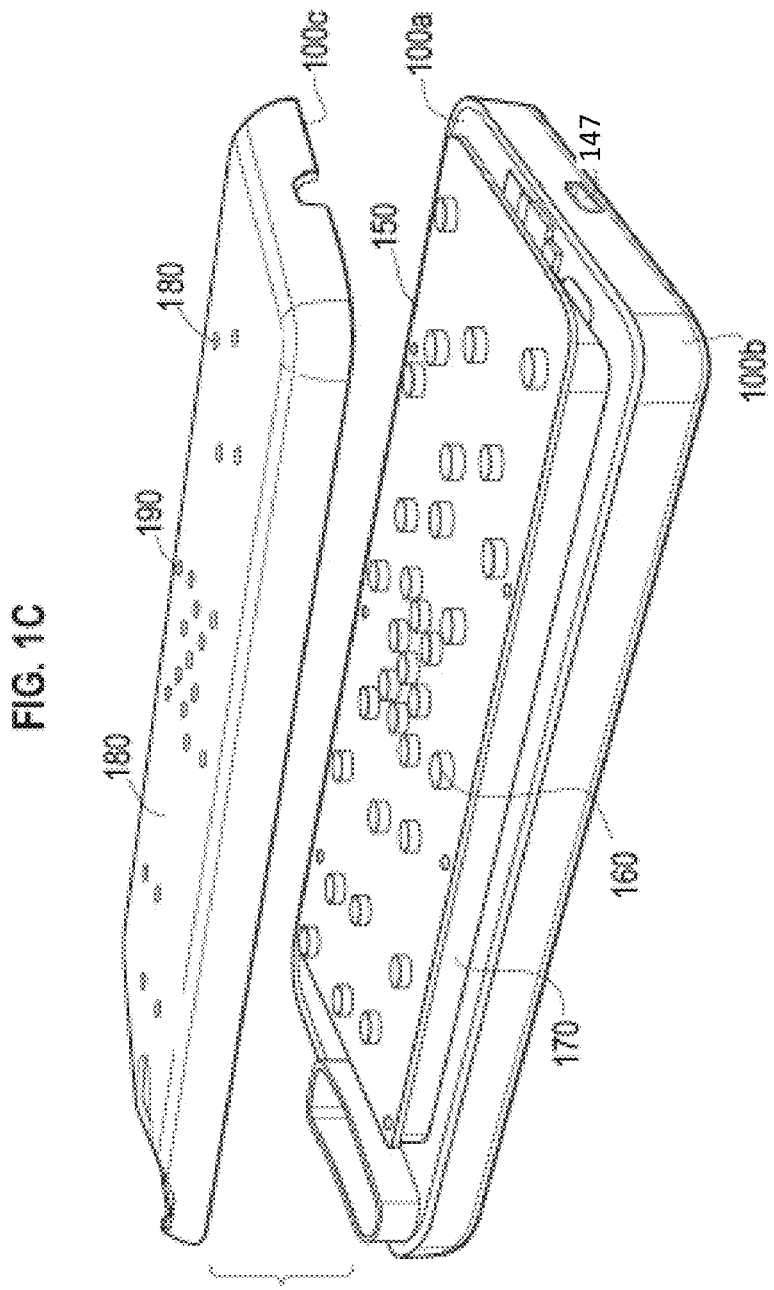
FIG. 1C shows a partially exploded side perspective view of an exemplary embodiment of the mobile device cover according to the present disclosure.
Figure 1G:
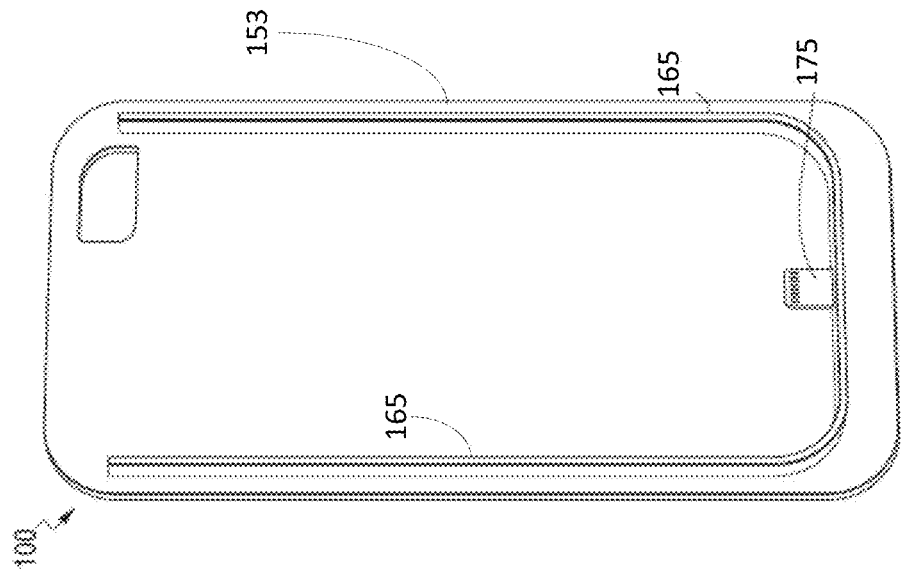
FIG. 1G shows a front side of an exemplary embodiment of a middle portion of the mobile device cover according to the present disclosure.
Figure 1F:
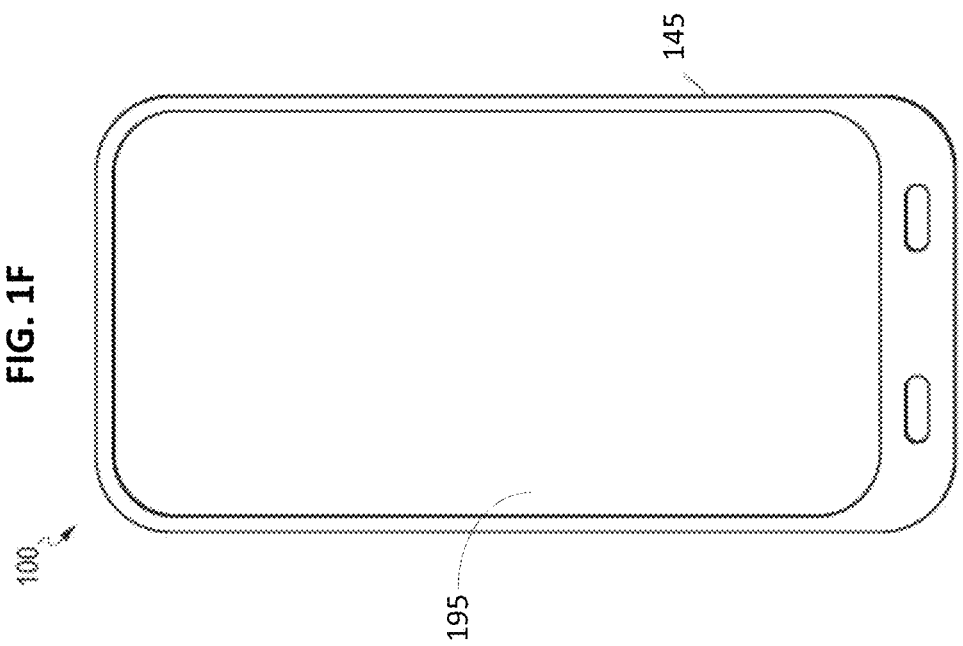
FIG. 1F shows a front side of an exemplary embodiment of a front portion of the mobile device cover according to the present disclosure.

FIG. 1A shows an exemplary mobile device cover 100 according to an embodiment of the present disclosure. As shown in FIG. 1A, the mobile device cover 100 (e.g., a cover, a case, a shell, a protector, etc.) is physically and/or electrically connected to a host mobile device 110. In some embodiments, the mobile device cover 100 is wirelessly connected to the host mobile device 110. In some embodiments according to the present disclosure, the host mobile device 110 (not shown in FIG. 1A except for a camera 125 and a sensor 135 on a back side 185 of the host mobile device 110) may be slipped inside or inserted into the mobile device cover 100, or the mobile device cover 100 can be snapped on or stretched around, at least in part, or otherwise can be fit around, at least in part, the host mobile device 110. FIGS. 1F and 1G show front sides of a front portion 145 and a middle portion 153 of the mobile device cover 100 according to some embodiments of the present disclosure. Referring to FIGS. 1F and 1G, the host mobile device 110 (not shown) can be inserted or locked in between the guides 165 of the middle portion 153. Although some embodiments contemplate a via in the mobile device cover 100 through which a female connector (e.g., a female USB-type connector) of the host mobile device can be accessed, other embodiments contemplate the mobile device cover 100 with a connector 175 (e.g., a lightning connector, a USB-type connector, a data connector, a recharging connector, multi-pin connector, etc.) that mates with the female connector of the host mobile device 110 to provide a connection (e.g., a power connection, a physical connection, an electrical connection, a signal connection, a synchronization connection, etc.). In some embodiments, the connector 175 provides a connection (e.g., electrical connection, data connection, etc.) between circuits in the host mobile device 110 and the mobile device cover 100. For example, the batteries in the host mobile device 110 and the mobile device cover 100 can charge each other via the connector 175 and/or other ports, for example. In some embodiments, the connector 175 is part of a connector assembly that includes a connector element 148, a coupler 149, and a port 147. In addition to or instead of the connector 175, the host mobile device 110 and the mobile device cover 100 can communicate wirelessly (e.g., Bluetooth communication, near field communication (NFC), other radio frequency (RF) communication (e.g., Wi-Fi), infrared communication, Zigbee communication, wireless personal area network (PAN) communication, IEEE 802.11 communication, etc.) with each other, as mentioned below. In some embodiments, the front side 145 of the mobile device cover 100 can be interlocked with the middle portion 153 of the mobile device cover 100 with the host mobile device 110 there between. As noted before, the main display of the host mobile device 110 may or may not be covered by a transparent material of the mobile device cover 100. In some embodiments, a window 195 is provided in the front portion 145 of the mobile device cover 100 so that the user can directly touch the display (e.g., touch-sensitive screen) of the host mobile device 110.

In some embodiments, the mobile device cover 100 can be an accessory to the host mobile device 110. In some embodiments, the mobile device cover 100 can be an accessory that is operable while separate from the host mobile device 110. The accessory can be in wireless communication with the host mobile device 110. In some embodiments, the mobile device cover 100 and the host mobile device 110 can be controlled via inputs (e.g., buttons, touch-sensitive screens, capacitive touch, sliders, graphical elements on graphical user interfaces, etc.) located on the mobile device cover 100, the host mobile device 110, a mobile application running on the host mobile device 110, a mobile application running on the mobile device case 100, a wired and/or wireless signal sent to the host mobile device 110, a wired and/or wireless signal sent to the mobile device cover 100, etc. The wireless signal can include, for example, Bluetooth signals, IEEE 802.11 signals, wireless local area network (WLAN) signals, wireless personal area network (PAN) signals, Zigbee signals, infrared signals, RF signals, etc. sent to the mobile device cover 100, the host mobile device 110, etc. Accordingly, the mobile device cover 100 and/or the host mobile device 110 include, for example, antennas and circuits (e.g., processors, wireless hardware, transceivers, transmitters, receivers, etc.) to support wireless communication between them 100, 110, and/or between the mobile device cover 100, the host mobile device 110, and/or other wireless devices (e.g., wireless speakers, wireless microphones, wireless headphones, wireless earbuds, wireless displays, base stations, access points, wireless networks, etc.).

Referring to FIG. 1A, a back side 158 of the back portion 155 (e.g., back cover) of the mobile device cover 100 is shown. The back portion 155 of the mobile device cover 100 has lights 160. The lights 160 can form, be a part of, and/or illuminate a screen (e.g., a main screen or display, indicator lights, light patterns, etc.) and can emit different colors with different intensities at different times. The lights 160 can also form, be a part of, and/or illuminate another screen 132 or an extension of the main screen along an edge 130 (e.g., a beveled edge, a chamfered edge, a side, a lateral side, a border of the screen 162, etc.) of the mobile device cover 100. Further, the lights 160 can illuminate beads 180 with different colors as indicator lights, for example. The beads 180 can be colored or not, and can be at least partially transparent, for example. In some instances, the beads 180 can take the configuration of letters, numbers, and/or shapes and can be flat or raised in structure. The beads 180 can be used as part of a Braille reader system, for example. In some instances, the beads 180 can include, for example, LED or light covers. In some examples, the beads 180 can be flat transparent plastic windows that can be positioned over lights 160. In such an instance, the beads 180 can be colored, and/or the lights 160 can provide color through colorless, transparent beads 180. In some embodiments, the beads 180 can be disposed throughout the back cover 155 of the mobile device cover 100 so that the beads 180 can be illuminated in particular colors, patterns, and/or intensities at particular times and/or in response to certain alerts or other information (e.g., digital signals, digital data, analog signals, etc.) received from the host mobile device 110.

In some embodiments, when the host mobile device 110 and the mobile device cover 100 are operatively coupled, the mobile device cover 100 can provide indicators and/or data (e.g., digital data, video data, streaming data, etc.) from the host mobile device 110 to the user via output interfaces (e.g., lights, screens, speakers, etc.) of the mobile device cover 100. In some embodiments, when the host mobile device 110 and the mobile device cover 100 are operatively coupled, the mobile device cover 100 and the host mobile device 110 are in one- or two-way digital and/or analog data communication. The mobile device cover 100 can display information, data, and/or content (e.g., multimedia content, video content, streaming content, social media content, scrolling text, etc.) received from the host mobile device 110. Further, the host mobile device 110 can display information, data, and/or content received from the mobile device cover 100. The host mobile device 110 and/or the mobile device cover 100 can cause information, data, and/or content to be displayed on the host mobile device 110. Further, the host mobile device 110 and/or the mobile device cover 100 can cause information, data, and/or content to be displayed on the mobile device cover 100. The information, data, and/or content can be received from the host mobile device 110, the mobile device cover 100, another device, and/or a third party, such as a mobile application, a website, etc. FIG. 1E shows an embodiment of the mobile device cover 100 in which the back cover 1030 includes the lights 160 forming a touch-screen display 162 that can be similar or the same as the display that can be shown on the main display of the host mobile device 110. Thus, for example, the touch-screen display 162 of the mobile device cover 100 can operate in a same or similar manner (e.g., same or similar graphical user interface, graphical elements, touch-and-feel, etc.) as the main display of the host mobile device 110. The touch-screen display 162 of the mobile device cover 100 can provide the same or similar array of icons 164 as the main display of the host mobile device 110, for example, or can be completely different. This can be useful, for example, if the display of the host mobile device 110 is being used for another purpose (e.g., playing a video, taking a call, work use, personal use, etc.), but the user wants to access other mobile applications. For example, the host mobile device 110 can be used to operate a GPS navigation application, while the mobile device cover 100 is being used to watch a movie or to stream video. Further, since the host mobile device 110 and the mobile device cover 100 can be in wireless communication, the mobile device cover 100 can be detached from the host mobile device 110 while watching the movie or streaming video, for example.

Referring to FIG. 1A, when the host mobile device 110 is receiving an incoming call, for example, beads 180 that form the word "CALL" on the back cover 155 of the mobile device cover 100 can be illuminated, caused to flicker, flash, etc. If a calendar event notification is activated or received by the host mobile device 110, for example, the beads 180 that form the word "ALERT" can be illuminated, caused to flicker, flash, etc. If a text message is received by the host mobile device 110, for example, the beads 180 that form the word "TEXT" can be illuminated, caused to flicker, flash, etc. These events and others (e.g., social media postings or messages, changes in sports scores, news items, emails, SMS messages, etc.) can also be displayed on the touch-screen display 162. The beads 180 can also be illuminated different colors and with different intensities to indicate different degrees of urgency. For example, if the alert is urgent (e.g., an email sent with "high importance"), the beads 180 that form the word "ALERT" can flash red and/or with increased intensity to indicate urgency. In another example, if the incoming call or text message is not from an important person, which can be designated via programming, user settings, user configurations, user preferences, etc., the corresponding beads 180 can be illuminated a dim blue. In some embodiments, the mobile device cover 100 can determine the identity of the caller or the message sender via electrical signals, sound signals, acoustic signals, wireless signals, digital signals, etc. received from the host mobile device 110. In some embodiments, the host mobile device 110 can determine the identity of the caller or the message sender and send a data signal corresponding to and/or identifying the caller or the message sender to the mobile device cover 100 as well as other information (e.g., voice mail, text message, indications of importance, etc.). Further, the user may be notified as to the name, number, email address, etc. of the sender or source of the alert, text, email, or other notification via the lights 160, beads 180, or other output devices (e.g., speakers, screens, vibration, etc.) of the mobile device cover 100.

In some embodiments, the mobile device cover 100 can be configured to provide video (e.g., live streaming video, streaming video, stored video, etc.) and/or other information (e.g., digital data, messages, news, alerts, etc.) on one or more screens. The video can be provided via the host mobile device 110, for example, or some other source to which the mobile device cover 100 and/or the host mobile device 110 is operatively coupled. For example, the mobile device cover 100 can have its own wireless link with an access point (e.g., an IEEE 802.11-compliant access point) or a base station (e.g., a cellular base station, a portable base station, etc.) from which to download media content. The mobile device cover 100 can also include memory storage (e.g., non-transitory memory storage, solid state memory storage, removable memory sticks, disks, cards, etc.) on which resides media content for playing or displaying on the screen of the mobile device cover 100 and/or the host mobile device 110. The video can be, for example, stored on the host mobile device 110 or can be streamed via a wireless link (e.g., cellular link, WIFI link, IEEE 802.11 link, wireless local area network (WLAN) link, Bluetooth link, RF link, etc.) with a content provider or a third party application. In some embodiments, closed captioning or subtitles can scroll along the main screen 162 which can include and/or be supplemented with one or more screens 132 on one or more edges 130 of the mobile device cover 100. In some embodiments, the mobile device cover 100 can be configured to provide an alert of a received video message and to play the video message on the screen 162 of the mobile device cover 100. The screen 162 of the mobile device cover 100 can be substantially independent or can substantially mirror the screen of the host mobile device 110. The screens 162, 132 can be incorporated into the housing of the electronic device. Further, the screen 162 of the mobile device cover 100 can be touch-sensitive and employ graphical elements of a graphical user interface. Thus, for example, a user input via the touch-sensitive screen 162 of the mobile device cover 100 can provide a user input to the host mobile device 110 and/or the mobile device cover 100. The screen of the mobile device cover 100 can be set up to substantially mirror the screen of the host mobile device 110 or to operate independently of the screen of the host mobile device 110. Content or material can also be displayed on the mobile device cover 100 and/or the host mobile device 110 that is from an application on the host mobile device 110, for example. For example, if the user has access to a sports application running on the host mobile device 110 that shows sports videos, television channels, movie channels, or live events on the host mobile device 110, the video may be displayed on the host mobile device 110 and/or the mobile device cover 100.

Some embodiments provide that digital signals can be received or provided by the host mobile device 110 and forwarded to the mobile device cover 100 for storage, processing, and/or output (e.g., on a display, lights, a speaker, a vibrating mechanism, etc.). For example, in addition to multimedia data, some embodiments provide that data (e.g., alphanumeric data, indicators, control data, source information, etc.) can be received or provided by the host mobile device 110 and forwarded to the mobile device cover 100 for storage, processing, and/or output. For example, the edge screen 132 (or any other light 160 screen on the mobile device cover 100) can be configured to scroll information relating to news, sports, live or recorded events or movies, stocks, weather, calendar events, text messages, alerts, email, social media messages (e.g., messages or posts from mobile applications or websites such as Facebook, Twitter, Snapchat, Instagram, etc.), etc. In some embodiments, the information can scroll around one or more edge screens 132 around the mobile device cover 100. In some embodiments, the host mobile device 110 can be set to periodically receive or retrieve sports data (e.g., scores, news items, etc.) or other types of data. The data can be from, for example, websites, mobile applications, other host mobile devices, etc. The host mobile device 110 can send sports data, for example, to the mobile device cover 100; and the mobile device cover 100 can display or scroll the data across the edge screen 132 of the mobile device cover 100 or display or scroll on the screen 162. In some embodiments, the edge screen 132 can be touch-sensitive, thereby allowing the user to tap, toggle, or swipe (or some other user input) an email notification and read a scrolling email on the edge screen 132 or on another display (e.g., the main display 162 on the back cover 155) of the mobile device cover 100. In some embodiments, the data can flow across the edge screen 132 in response to a finger sweeping motion along the edge touch-sensitive screen 132. In one embodiment, an incoming text message can be indicated by the beads 180 forming the word "TEXT" being illuminated by lights 160, the sender of the incoming text can be displayed on the edge screen 132, and the text of the text message can be displayed on the main screen 162 on the back cover 155 of the mobile device cover 100. In one embodiment, alphanumeric letters are displayed on the screen on the back cover 155 and the edge 130, either simultaneously or independently, indicating that a text message has been received and possibly displaying the sender's name, the sender's associated icon (e.g., icon, emoji, animated icon, animated emoji, etc.), the sender's associated image (e.g., sender's picture), the sender's subject, the sender's header, the sender's body text, the sender's partial or full text, etc. A text or email icon can be displayed instead of the words TEXT, for example. The display can also be a series of LEDs forming a grid to accommodate lights show, scrolling text, etc.

The edge screen 132 can be configured to scroll completely or partially around the mobile device cover 100 and/or along one or more of its edges 130. In some embodiments, the edge 130 can be segmented or partitioned so that the right edge portion is reserved for a first subject (e.g., stocks), the left edge portion is reserved for a second subject (e.g., sports), the bottom edge portion is reserved for a third subject (e.g., email), and the top edge portion is reserved for a fourth subject (e.g., calendar items, alerts, etc.), for example. Within each segment, the edge screen 132 can scroll the data. In some embodiments, the user can program and/or select which subject is displayed on each individual segment on the mobile device cover 100. In some embodiments, the user can program the mobile device cover 100 so that it decides on which segment to display a particular subject (e.g., incoming call, incoming text, incoming email, incoming message, mobile device notification, mobile device accessory notifications, music or other audio notifications, social media notifications, etc.).

FIG. 1B shows a top view of an embodiment of the mobile device cover 100 according to the present disclosure. FIG. 1C shows a partially exploded side perspective view of an embodiment of the mobile device cover 100 according to the present disclosure.

Referring to FIGS. 1B and 1C, the mobile device cover 100 can be adapted, for example, to provide physical vias (e.g., access openings and windows) through which various input interfaces and output interfaces of the host mobile device 110 can be accessed without detaching the mobile device cover 100 from the host mobile device 110. In some embodiments, the mobile device cover 100 may provide a physical opening to access a display, a camera, a button, a control, other input/output (I/O) interfaces, etc. of the host mobile device 110. In some embodiments, the mobile device cover 100 does not cover the main display of the host mobile device 110 when the mobile device cover 110 is attached to the host mobile device 110. In some embodiments, the mobile device cover 100 may provide a transparent or partially transparent cover portion, for example, over a display or other portions of the host mobile device 110. The transparent cover portion can be made of materials that, for example, do not interfere with the operation of any of the touch screens, speakers, and/or buttons of the host mobile device 110. In some embodiments, the materials can be substantially transparent to wireless communication links used by the host mobile device 110 and/or the mobile device cover 100. The transparent cover portion may also protect areas of the host mobile device 110 such as touch screens from scratches or other damage.

Some embodiments according to the present disclosure may provide that the mobile device cover 100 is made of one or more of the following materials: silicone, rubber, metal, plastic, polymers, polycarbonates, composites, cloth, metal, wood, acrylic, glass, plexiglass, and/or other materials. The cover material may be, at least in part, opaque or transparent. The cover material may assist a user in gripping the host mobile device 110 and may protect the host mobile device 110. The cover material may be, for example, one or more of the following: shock resistant, shock proof, shatter proof, shatter resistant, dust resistant, dust proof, water resistant, water proof, etc. In some embodiments, the mobile device cover 100 may be made up of multiple pieces (e.g., portions 100a, 100b, 100c, one or more printed circuit boards, housings, etc.), as shown in FIGS. 1B and 1C. In some embodiments, the multiple pieces of the mobile device cover 100 interlock together to house, become the back panel of the host mobile device 110, and/or to connect (e.g., physically and/or electrically connect, snap, interlock, etc.) to the host mobile device 110.

Referring to FIGS. 1B and 1C, the mobile device cover 100 can include, for example, circuitry 150 and lights 160 disposed on one or more printed circuit boards. In some embodiments, the circuitry 150 can include one or more of the following: one or more processors, one or more non-transitory memories, signal processors, light control circuitry, light drive circuitry, battery recharging circuitry, battery control circuitry, display control circuitry, sensors, input interface circuitry, output interface circuitry, digital-to-analog converters, analog-to-digital converters, wired transceivers, wireless transceivers, input/output ports, input/output interfaces, and antennas. The one or more non-transitory memories can be configured to store, for example, data (e.g., input data, data received from the host mobile device 110, stored reference data, stored configuration data, stored personal data, etc.) and processor-executable instructions or code for use with the one or more processors. The circuitry 150 can be connected, for example, to and/or can include the lights 160. Some embodiments provide that the lights can include one or more of the following: LEDs, flexible active-matrix OLEDs (AMOLEDs), OLEDs, phosphor-based LEDs, white LEDs (WLEDs), multi-color WLEDs, semiconductor LEDs, other types of LEDs, LCDs, LCD touch screens, electroluminescence, pixel displays, etc., and can be arranged or used in a specific pattern, array, sequence, etc. Some embodiments provide that the lights can be raised or provide bumpy surfaces suitable for use in a Braille system. Various components and/or elements of the circuitry 150 can be connected to each other through one or more buses, for example.

The mobile device cover 100 can also include, for example, a battery 170 (e.g., a rechargeable battery, a non-rechargeable battery, etc.) that can be used to power, for example, the circuitry 150, the lights 160, and any other circuitry or components in the mobile device cover 100 and/or the host mobile device 110. The battery 170 can also be used to power the host mobile device 110 and/or to recharge a battery in the host mobile device 110. In some embodiments, the mobile device cover 100 does not have a battery and instead can be powered by the host mobile device 110. Some embodiments according to the present disclosure provide that the battery 170 can be rechargeable or not rechargeable. If not rechargeable, the battery 170 can be replaced. Some embodiments of the battery 170 include, for example, a lithium battery, an alkaline battery, a silver-oxide battery, nickel cadmium battery, nickel metal hydride battery, lithium ion battery, lithium ion polymer battery, etc. If rechargeable, then the battery 170 can be recharged, for example, by drawing energy from one or more interfaces of the host mobile device 110 (e.g., an audio port, an earphone jack, a docking port (e.g., a USB-type port, a lightning connector port, a power and signaling connection port, etc.), a wireless charging pad, etc.). The battery 170 can also be recharged by drawing energy separate from or independent of the host mobile device 110. Similarly, a rechargeable battery of the host mobile device 110 can be charged through one or more interfaces of the host mobile device 110 that are electrically and/or wirelessly connected to the mobile device cover 100. The rechargeable battery of the host mobile device 110 can also be recharged by drawing energy separate from or independent of the host mobile device 110.

For example, independent of whether the mobile device cover 100 is connected to the host mobile device 110, the mobile device cover 100 and/or the host mobile device 110 can be separately plugged into a wall outlet or wirelessly charged at a wireless charging station. The mobile device cover 100 can also be charged by plugging it into a computer, a charger bank, a generator, etc. via a USB-type connection, for example. The battery 170 of the mobile device cover 100 can be charged by a piezoelectric battery charger, for example. In some embodiments, the piezoelectric battery charger can convert force (e.g., caused by pressure, movements, mechanical forces, etc.) into electrical energy for use by the battery 170. Some embodiments contemplate converting other types of energy (e.g., sound energy, light energy, electromagnetic energy, solar energy, magnetic energy, thermal energy, moving air, wireless energy, etc.) into electrical energy to charge the battery 170. For example, the mobile device cover 100 can be configured to convert solar energy to recharge its battery 170. In some embodiments, the mobile device cover 100 can utilize charging methods such as conductive and inductive charging.

In some embodiments, the battery 170 of the mobile device cover 100 can also be recharged when the host mobile device 110 is wirelessly or wiredly connected to a power source (e.g., AC and/or DC power source). For example, the battery 170 of the mobile device cover 100 can be recharged when the host mobile device 110 is connected to a wall outlet, for example, such as when a docking port of the host mobile device 110 is connected to a wall outlet. The battery 170 may receive energy directly from the wall outlet (e.g., via connecting the mobile device cover 100 directly to the wall outlet) or indirectly from the wall outlet through the host mobile device 110. In addition, the battery 170 may receive energy when a docking port or some other interface of the host mobile device 110 is connected to a computer while electrically and/or wirelessly connected to the mobile device cover 100. Some embodiments according to the present disclosure contemplate that the circuitry 150 receives power from the host mobile device 110 without using the battery 170 or in combination with the battery 170. Thus, some embodiments according to the present disclosure might not have a dedicated battery as part of the mobile device cover 100, or might use the battery 170 as a back-up power source.

In some embodiments, just as the battery 170 of the mobile device cover 100 can draw on energy from the host mobile device 110, the battery of the host mobile device 110 can draw on energy from the mobile device cover 100 to recharge the battery of the host mobile device 110 or to supplement power to the host mobile device 110. For example, as rechargeable batteries age, they are less capable of fully powering the main processor on the host mobile device 110. The aging batteries have reduced full charge capacity and provide less power, voltage, and/or current during normal operation. As a result, some processors (e.g., central processor, graphics processor, general processor, dedicate processor, etc.) will enter a power-save mode in which processor speed (e.g., clock speed) and/or load capacity (e.g., peak load) are reduced to conserve power and/or energy which is detrimental to performance and/or inconvenient to the user. In such a situation, the host mobile device 110 can supplement the power and capacity of its own battery with the battery 170 of the mobile device cover 100, thereby avoiding the power-save mode of the processor of the host mobile device 110 or vice versa. Accordingly, the processors in the host mobile device 110 can continue to operate at normal operation speeds and load capacities. Further, by supplementing power and capacity of the host mobile device 100, the battery 170 of the mobile device cover and the battery of the host mobile device 110 can be used to power a turbo mode in the processor of the host mobile device 110 or vice versa. For example, in turbo mode, the processor (e.g., a central processor, graphics processor, general processor, dedicated processor, etc.) of the host mobile device 110 can operate at one or more of the following: a higher voltage, a higher current, a higher power, a higher load capacity, and/or a higher clock speed than during normal operation. During turbo mode, the host mobile device 110 and/or the mobile device cover 100 can operate with greater performance and can perform more processor-intensive applications.

In some embodiments, when the host mobile device 110 is electrically connected to the mobile device cover 100 (e.g., when the host mobile device 110 has been inserted into the mobile device cover 110) and the mobile device cover 100 is plugged into a wall outlet, for example, the battery 170 of the mobile device cover 100 and the battery of the host mobile device 110 charge at the same time. In some embodiments, the battery of the host mobile device 110 charges without a decrease in charge speed even when the host mobile device 110 and the mobile device cover 100 are charged at the same time via, for example, the electrical connection (e.g., via a port 147) of the mobile device cover 100 to the wall plug, or a wireless charging station.

FIG. 1D shows an exploded side perspective view of an embodiment of the mobile device cover 100 according to the present disclosure. In some embodiments, the circuitry 150 can be embedded in the mobile device cover 100. In some embodiments, the circuitry 150 may include, for example, one or more circuit boards 150a including, for example, one or more of the following: one or more processors, circuit elements or components, an integrated circuit, an integrated circuit chip, a system on a chip, etc. The circuitry 150 may also include, for example, one or more sensors 150b (e.g., an audio sensor, a signal sensor, an optical sensor, a wireless signal sensor, a wireless receiver, a wireless transceiver, an electrical sensor, a power sensor, a battery sensor, an electromagnetic sensor, a vibration sensor, gyroscope sensor, iris scanner, fingerprint sensor, accelerometer, proximity sensor, barometer, hear rate sensor, a biometric sensor, etc.). Components 150a and 150b can be part of the same circuit board or can be part of separate circuit boards, for example, that are connected to form, in part, the mobile device cover 100. A sensor can be part of components 150a, 150b, or both. In some embodiments, the mobile device cover 100 can include multiple circuit boards or multiple-layered circuit boards.

Figure 2:
FIG. 2 shows an exemplary embodiment of a circuit arrangement according to the present disclosure.

FIG. 2 illustrates an embodiment of a circuit arrangement according to the present disclosure. Referring to FIG. 2, a simplified block diagram is shown of the circuitry 150. The circuitry 150 may include one or more of the following: a processor 200, a memory 210, an I/O device 220, a bus 230, driver circuitry 240, and lights 160. The processor 200, the memory 210, the I/O device 220, the driver circuitry 240, and the lights 160 can be coupled to each other via one or more buses 230. The circuitry 150 can include more or less than one processor 200, one memory 210, one I/O device 220, one bus 230, one driver circuit 240, and two lights 160 as illustrated in FIG. 2. Thus, some embodiments contemplate employing different numbers of various elements of the circuitry 150.

The driver circuitry 240 can include, for example, one or more of the following: light drivers, LED drivers, shift registers, constant current supply, constant voltage supply, switching supply, FET amplifier, BJT amplifier, etc. In addition, some embodiments according to the present disclosure contemplate using a plurality of sensors, processors, memories, and/or driver circuits. Some embodiments provide that the driver circuitry 240 can be part of the processor 200 and, in some embodiments, can take the place of the processor 200. Some embodiments provide that the driver circuitry 240 and other circuitry can be incorporated into a system on a chip (SOC). In some embodiments, the driver circuitry 240 can be configured to control any amount or arrangement of similar or different lights 160, including a full display (e.g., a touch-sensitive screen, LED screen, etc.). In some embodiments, the driver circuitry 240 can be configured to power any number or arrangement of similar or different lights 160.

The I/O device 220 can include, for example, one or more of the following: an input device (e.g., a button), a touchscreen display, a wired and/or wireless transceiver (e.g., cellular transceiver, Bluetooth transceiver, WLAN transceiver, etc.), a wired and/or wireless transmitter, a wired and/or wireless receiver, an antenna, a speaker, a microphone, an I/O port (e.g., earbud port, earphone port, microphone port, speaker port, etc.), an I/O interface, data connector port, power connector port, wired and/or wireless communication device, GPS receiver, a network interface, etc.

The processor 200 can include, for example, one or more of the following: a general processor, a central processing unit, a digital filter, a microprocessor, a digital processor, a digital signal processor, a microcontroller, a programmable array logic device, a complex programmable logic device, a field-programmable gate array and an application specific integrated circuit (ASIC), and a memory (e.g., a cache). Code, instructions, software, firmware, and data may be processed and/or executed by the processor 200 to perform any of the operations, functions, and/or features described in the present disclosure. Further, the code, instructions, software, firmware, and/or data may be stored in the processor 200 and/or the memory 210. The code, instructions, software, firmware, and/or data can be automatically or manually updated, upgraded, modified, replaced, overwritten, supplemented, etc. via a wireless or wired connection.

The memory 210 can include, for example, one or more of the following: a non-transitory memory, a non-transitory processor readable medium, a non-transitory computer readable medium, a read only memory (ROM), a random access memory (RAM), DRAM, EPROM, EEPROM, F-RAM, FIFO, NVRAM, SRAM, a cache, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory 210 may be configured to store code, instructions, software, firmware, and data for use by the processor 200 and may be external, internal, or both with respect to the processor 200. Further, the code, instructions, software, firmware, and/or data can be automatically or manually updated, upgraded, modified, replaced, overwritten, supplemented, etc. via a wireless or wired connection.

Some embodiments provide that a mobile application can be downloaded onto the host mobile device 110 to provide a graphical user interface that can be used, for example, to control the mobile device cover 100. The mobile application can run on the host mobile device 110 and/or the mobile device cover 100. Further, the mobile application can be automatically or manually updated, upgraded, modified, replaced, overwritten, supplemented, etc. via a wireless or wired connection.

Figure 4:
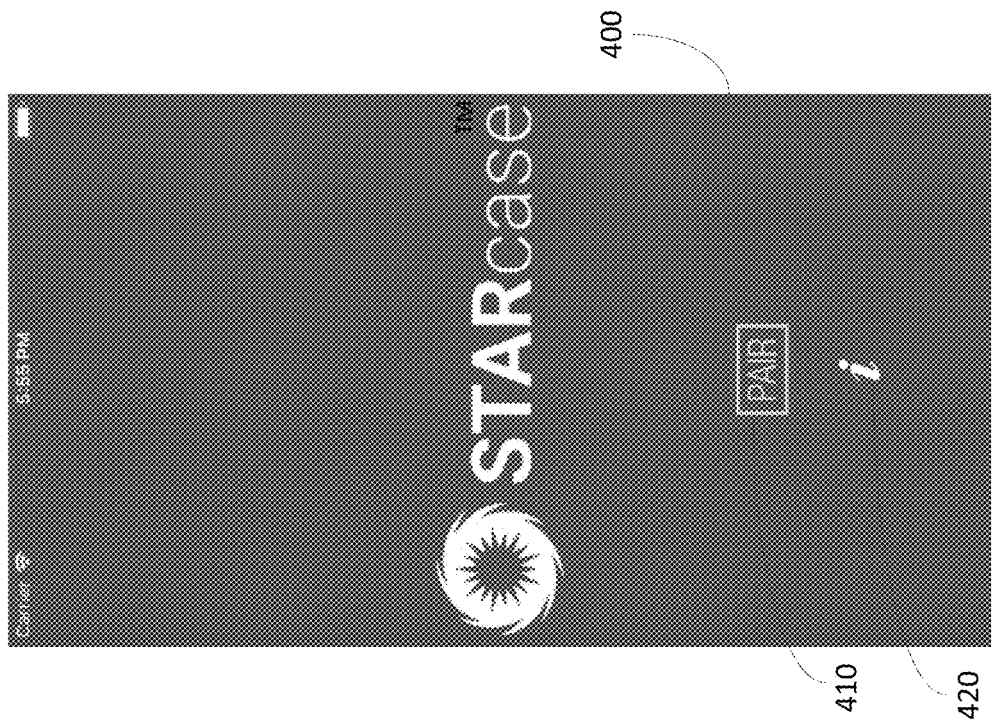
FIG. 4 shows an exemplary front page of a mobile application according to an embodiment of the present disclosure.
Figure 3:
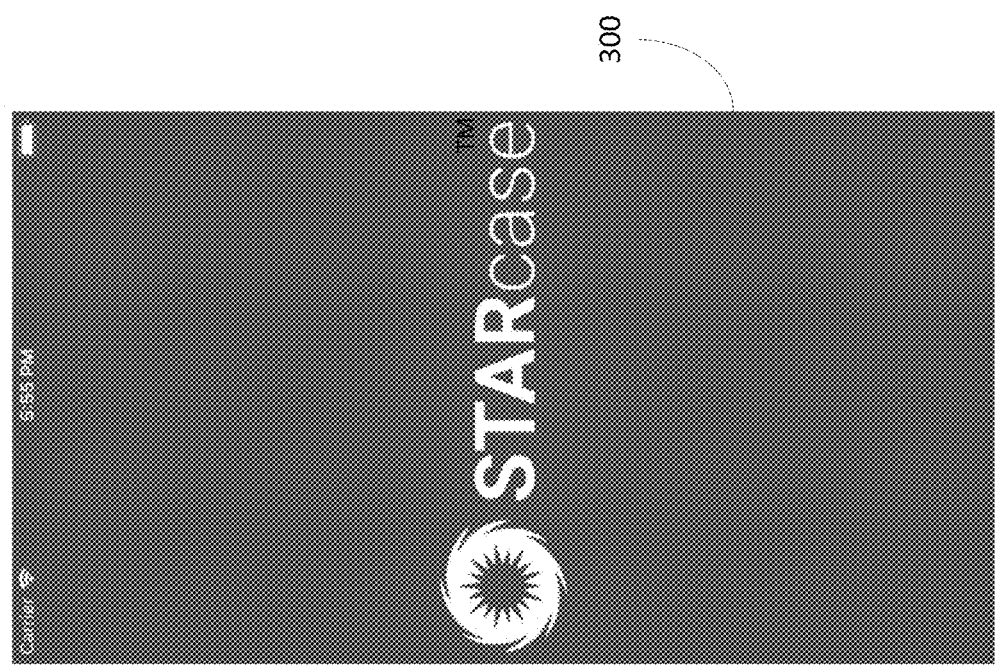
FIG. 3 shows an exemplary launch screen page of a mobile application according to an embodiment of the present disclosure.

FIGS. 3 and 4 show an exemplary launch screen page and an exemplary front page according to an embodiment of the present disclosure. The mobile application can be represented as an icon on the display of host mobile device 110 and/or the mobile device cover 100. When the icon is selected, the mobile application runs on the host mobile device 110 and a launch page as shown in FIG. 3 is displayed by the host mobile device 110. Subsequently, a front page as shown in FIG. 4 is displayed. While the front page is being displayed, the mobile application attempts to wirelessly and/or wiredly connect the host mobile device 110 and the mobile device cover 100 according to an embodiment of the present disclosure. In one embodiment, the mobile application attempts to connect and pair the mobile device cover 100 and the host mobile device 110, which are both Bluetooth-enabled. If unsuccessful, the mobile application according to some embodiments attempts to establish an alternative connection such as, for example, a USB-type connection, WiFi connection, Zigbee connection, cellular connection, etc.

Figure 5:
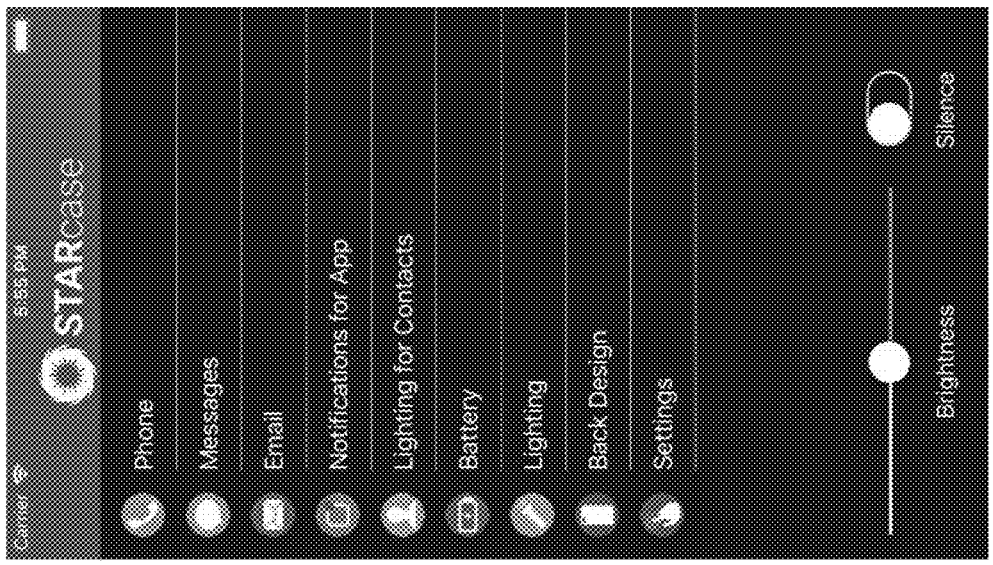
FIG. 5 shows an exemplary home page of a mobile application according to an embodiment of the present disclosure.

FIG. 5 shows an exemplary home page according to an embodiment of the present disclosure. Upon successful connection and pairing, the mobile application displays a home page as shown in FIG. 5. The home page provides a graphical user interface by which the user can navigate the mobile application. Referring to FIG. 5, the home page includes icons or hyperlinks to a phone page, a message page, an email page, a notification for the application page, a lighting for contacts page, a battery page, a lighting page, a back design page, and a settings page. In addition, the home page provides for controlling a brightness of a display and/or a volume for a speaker for the mobile device cover 100 and/or the host mobile device 110.

In some embodiments, the phone page, the message page, and the email page provide the user with the ability to set up a particular lightshow (e.g., light pattern, animated light pattern, video, etc.), a particular icon (e.g., icon, emoji, graphical element, etc.), and/or a particular text (e.g., scrolling text) to be displayed for a particular contact and/or a particular type of communication (e.g., phone, message, email, etc.) for that particular contact on a contact list stored in the host mobile device 110.

In some embodiments, the notifications for application page sets up the type of notification (e.g., an alert, no alert, scroll contents of notification, icon, light show, etc.) for other mobile applications (e.g., eBay, calendar, clock, Amazon, Facebook, Snapchat, Instagram, LinkedIn, etc.).

In some embodiments, the lighting for contacts page allows the user to view and assign lightshows, light icons, or other displays for a particular contact name.

In some embodiments, the lighting page allows the user to set the lighting settings for the mobile device cover 100. For example, brightness and duration values of displays (e.g., lightshows, etc.) can be configured. Further, the lighting page can be used to set up flashlights, reading lights, selfie lights, soft lights, lightshows, light icons, animations, scrolling text, clock faces, hazard lights, etc. Each type of display can be further configured according to duration, brightness, animation, and other display settings.

In some embodiments, the back design page allows the user to select the type of mobile device cover 100 that is being used since different mobile device covers 100 can be configured for different types of displays and different functions or features. For example, some mobile device cover 100 can have one display, while others can have more than one display and/or edge displays.

In some embodiments, the settings page allows the user to access additional settings.

Figure 6:
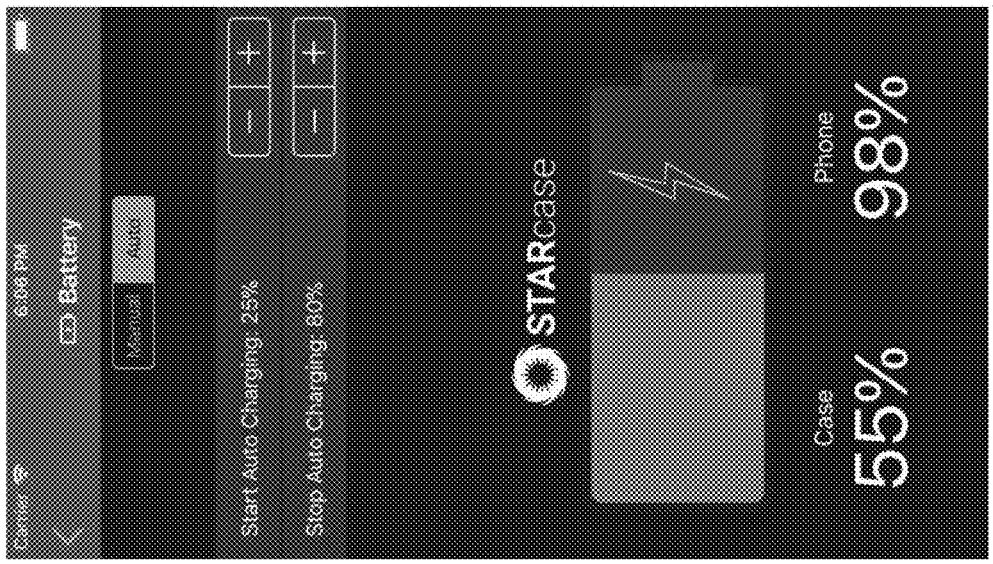
FIG. 6 shows an exemplary battery page of a mobile application according to an embodiment of the present disclosure.

FIG. 6 shows an exemplary battery page according to an embodiment of the present disclosure. In some embodiments, the battery page allows the user to change the battery settings of host mobile device 110 and/or the mobile device cover 100. Referring to FIG. 6, the current battery percentage is shown for the mobile device cover 100 and the host mobile device 110. For example, the mobile device cover 100 has a battery charge of 55%; the host mobile device 110 (e.g., a mobile phone) has a battery charge of 98%. When fully charged, the battery charge indicates 100%. The mobile device cover 100 can also include, for example, four battery indication LEDs to indicate battery charge. For example, if the battery 170 of the mobile device cover 100 is fully charged, then the four battery indication LEDs can be lit; if the battery 170 of the mobile device cover 100 is only half charged, then two of the four battery indication LEDs can be lit; etc. In some embodiments, when either the host mobile device 110 or the mobile device cover 100 is charging, a charging icon overlays the battery figure. In some embodiments, when either the host mobile device 110 or the mobile device cover 100 is charging, the battery indication LEDs can portray this to the user (for example, a pattern, strobe, etc.). The charging icon can overlay the battery figure or the respective portion of the battery figure corresponding to the battery that is being charged (e.g., the battery 170 of the mobile device cover 100 and/or the battery of the host mobile device). The battery page also allows the user to turn on or off the automatic charging of the selected battery (e.g., the battery 170 of the mobile device cover 100 and/or the battery of the host mobile device). In some embodiments, this can be achieved by a single touch of the page displayed on a graphical user interface of the host mobile device 110 or the mobile device cover 100, or by actuating a button on the host mobile device 110 or the mobile device cover 100.

In some embodiments, the battery page allows the users to determine how the battery of the host mobile device 110 and the battery of the mobile device cover 100 interact. The host mobile device 110 and the mobile device cover 100 comprise sensors that detect voltage, current, and/or power supply and report the detected voltage, current, and/or power supply to one or more processors or other circuitry in the host mobile device 110 and/or the mobile device cover 100. The sensors can be used to detect the amount of charge or power remaining in the batteries of the host mobile device 110 and/or the mobile device cover 100. This battery charge information, for example, can be shown on the battery page. Further, one or more processors or other hardware in the host mobile device 110 and/or the mobile device cover 100 can receive battery charge information, for example, for the batteries via the sensors. The battery charge information can then be sent to one or both of the host mobile device 110 and the mobile device cover 100. The one or more processors or other hardware in the mobile device cover 100, for example, can cause the batteries in the mobile device cover 100 and/or the host mobile device 110 to charge one another. Similarly, the one or more processors or other hardware in the host mobile device 110 can cause the batteries in the host mobile device 110 and/or the mobile device cover 100 to charge one another. Such charging configurations can be set up using the battery page. In addition, the battery page or variations thereof can be used to implement and illustrate the embodiments relating to battery charging disclosed herein. In some embodiments, the battery page or variations thereof can be displayed on the host mobile device 110 and/or the mobile device cover 100. Graphical or actual buttons on the host mobile device 110 and/or the mobile device cover 100 can be used to set up the battery charging configuration. In one embodiment, a single physical button on the host mobile device 110 and/or the mobile device cover 100 can be used to set up the battery charging configuration.

Figure 7:
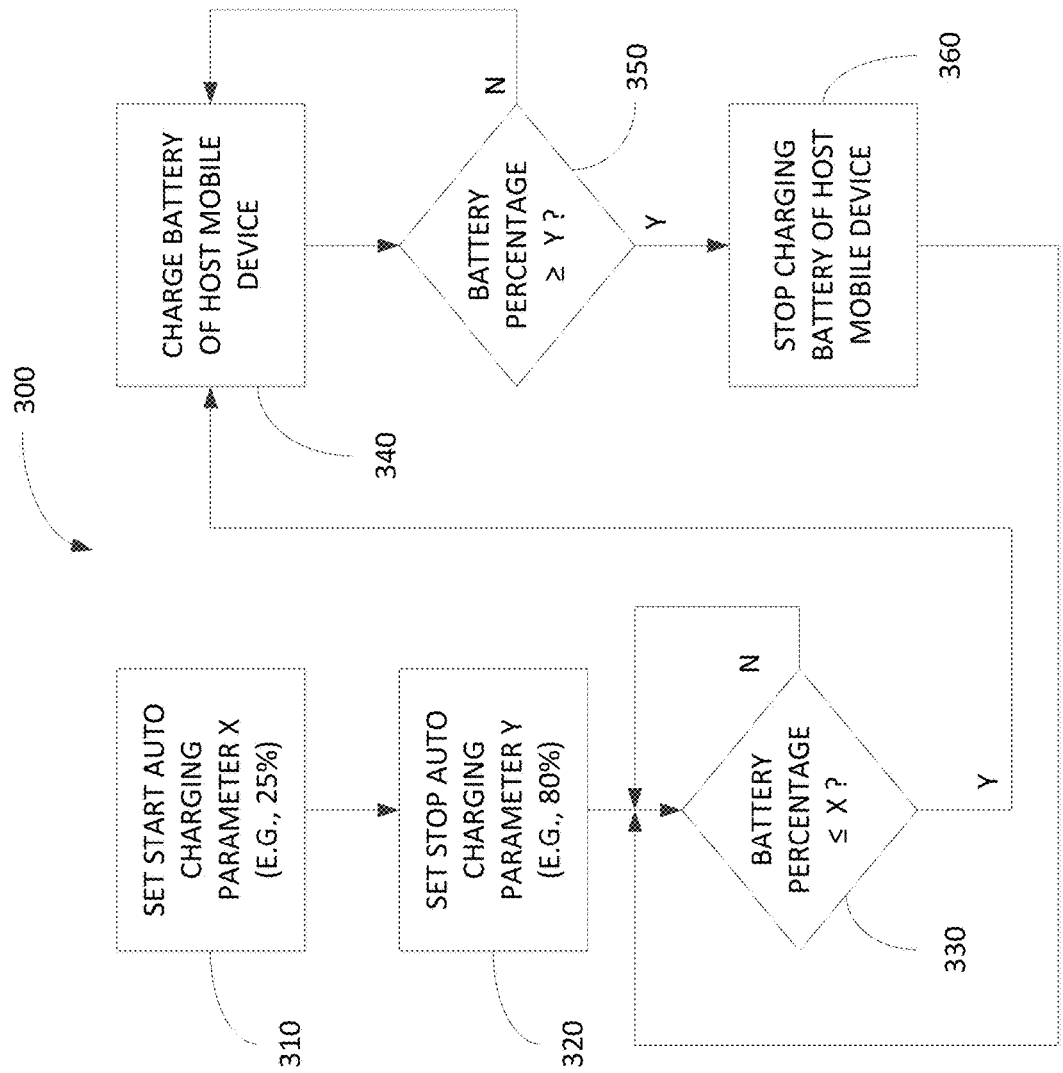
FIG. 7 shows a flowchart of a process for charging a battery of a host mobile device according to an exemplary embodiment of the present disclosure.

In some embodiments, the user can set auto charging parameters in a process 300 in which the mobile device cover 100 charges the host mobile device 110 as shown in an exemplary flowchart in FIG. 7. Referring to FIG. 7, a user can manually set or automatically set (e.g., automatically set to preset or default values) a start auto charging parameter X (e.g., 25%) in step 310 and a stop auto charging parameter Y (e.g., 80%) in step 320. Graphical or physical buttons can be provided to enter or incrementally increase or decrease the charging parameters, or to enter numerical values. The charging parameters are sent to the mobile device cover 100 (or the host mobile device 110) as a signal (e.g., a digital wireless or wired signal). In query 330, if the battery percentage of the battery of the host mobile device 110 is greater than 25%, then query 330 is repeated. In query 330, if the battery percentage of the battery of the host mobile device drops to or below 25%, then the battery 170 of the mobile device cover 100 automatically charges the battery of the host mobile device 110 in step 340. In query 350, if the battery percentage of the battery of the host mobile device 110 is less than 80%, then the battery 170 of the mobile device cover 100 automatically charges the battery of the mobile host device 110 in step 340. In query 350, if the battery percentage of the battery of the host mobile device 110 reaches or exceeds 80%, then the charging of the battery of the host mobile device 110 automatically stops in step 360. The process 300 returns to query 330, and the charging of the battery of the host mobile device 110 does not automatically start again in step 340 until the battery percentage of the battery of host mobile device 110 reaches or drops below 25%. In some embodiments, the user can set a battery percentage of the battery 170 of the mobile device cover 100 below which the battery 170 of the mobile device cover 100 automatically stops charging the battery of the host mobile device 110.

Figure 8:
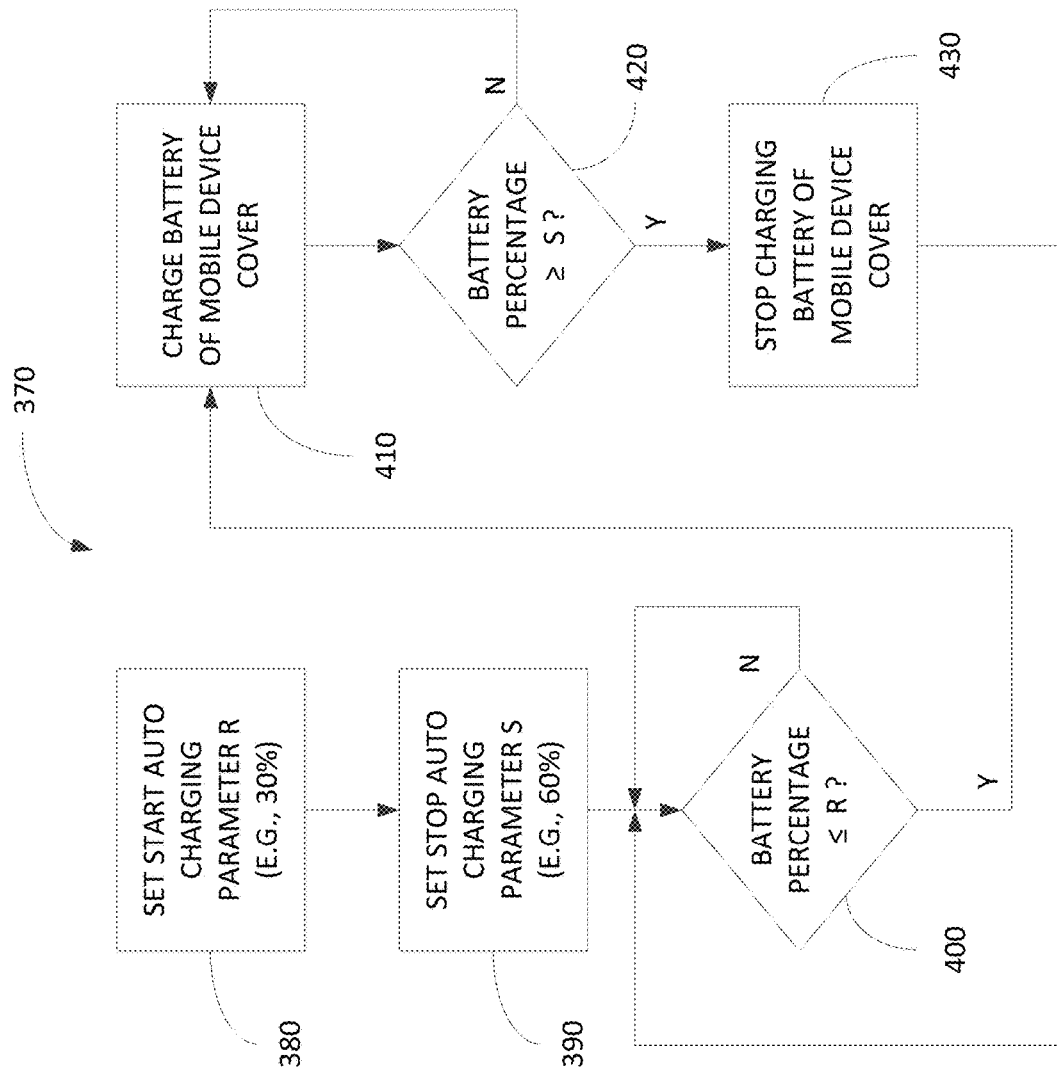
FIG. 8 shows a flowchart of a process for charging a battery of a mobile device cover according to an exemplary embodiment of the present disclosure.

In some embodiments, the user can set auto charging parameters in a process 370 in which the host mobile device 110 charges the mobile device cover 100 as shown in an exemplary flowchart in FIG. 8. Referring to FIG. 8, a user can manually or automatically set (e.g., automatically set to preset or default values) a start auto charging parameter R (e.g., 30%) and a stop auto charging parameter S (e.g., 60%). Graphical or physical buttons can be provided to enter or incrementally increase or decrease the charging parameters, or to enter numerical values. The charging parameters are sent to the mobile device cover 100 (or the host mobile device 110) as a signal (e.g., a digital wireless or wired signal). In query 400, if the battery percentage of the battery 170 of the mobile device cover 100 is greater than 30%, then query 400 is repeated. In query 400, if the battery percentage of the battery 170 of the mobile device cover 100 drops to or below 30%, then the battery of the host mobile device 110 automatically charges the battery 170 of the mobile device cover 100 in step 410. In query 420, if the battery percentage of the battery 170 of the mobile device cover 100 is less than 60%, then the battery of host mobile device 110 automatically charges the battery 170 of the mobile device cover 100 in step 410. In query 420, if the battery percentage of the battery 170 of the mobile device cover 100 reaches or exceeds 60%, then the charging of the battery 170 of the mobile device cover 100 automatically stops. The process 370 returns to query 400, and the charging of the battery 170 of the mobile device cover 100 does not automatically start again in step 410 until the battery percentage of the battery 170 of mobile device cover 100 reaches or drops below 30%. In some embodiments, the user can set a battery percentage of the battery of the host mobile device 110 below which the battery of the host mobile device 110 automatically stops charging the battery 170 of the mobile device cover 100.

Some embodiments contemplate implementing processes for charging one or both of the battery of the host mobile device 110 and the battery 170 of the mobile device cover 100 according to battery percentages, for example.

In some embodiments, the battery page allows the user to manually select one battery to charge the other and to initiate charging. For example, the user can select the battery of the host mobile device 110 to charge the battery 170 of the mobile device cover 100, or vice versa. In some embodiments, charging can be toggled on until toggled off, and/or can be timed. Battery charging parameters can also be set by the user during manual charging that determine when the manually-initiated charging automatically stops. For example, the manually-initiated charging can automatically stop if the battery being charged reaches or exceeds a particular battery percentage, or the battery being used as a charging source reaches or drops below a threshold battery percentage.

In some embodiments, the battery page allows the user to supplement the power supply of the host mobile device 110 or the mobile device cover 100. For example, as rechargeable batteries age, they are unable to provide the voltage and/or current as when the battery was new. This can affect the performance of the processor over time. If the voltage and/or current supplied by the battery is low enough, the processor can be forced to slow down as part of a power-save mode, which detrimentally affects the operation of the host mobile device 110, for example, and the operation of the applications running on the host mobile device 110. Accordingly, if the battery of the host mobile device 110 ages to the point that the processor needs to go into a power-save mode, some embodiments provide that the battery page can be used to manually or automatically supplement the battery of the host mobile device 110. The battery 170 of the mobile device cover 100 can supplement the current, voltage, and/or power provided by the battery of the host mobile device 110 so that the processor is fully powered and need not go into a power-save mode.

In some embodiments, even if the processor is not operating in a power-save mode, the battery page can be used to manually or automatically supplement the battery of the host mobile device 110 to cause the processor to run in a turbo-mode that is faster than its normal operation. In some embodiments, the host mobile device 110 may be operating too many I/O devices and may require additional power. The battery page can be used to manually or automatically supplement the battery of the host mobile device 110 so that the host mobile device 110 can drive even more I/O devices than it is currently capable of driving.

In some embodiments, the battery page displays battery energy as a percentage of the total energy of the batteries of the mobile device cover 100 and the host mobile device 110. For example, if the batteries of the mobile device cover 100 and the host mobile device 110 are fully charged and have the same charge capacity, the battery page would display a battery energy percentage of 50% for the mobile device cover 100 and a battery energy percentage of 50% for the host mobile device 110. If the mobile device cover 100 has a battery 170 that is fully charged and has twice the charge capacity of the battery of the host mobile device 110, then the battery page would display a battery energy percentage of 67% for the mobile device cover 100 and a battery energy percentage of 33% for the host mobile device 110.

Figure 9:
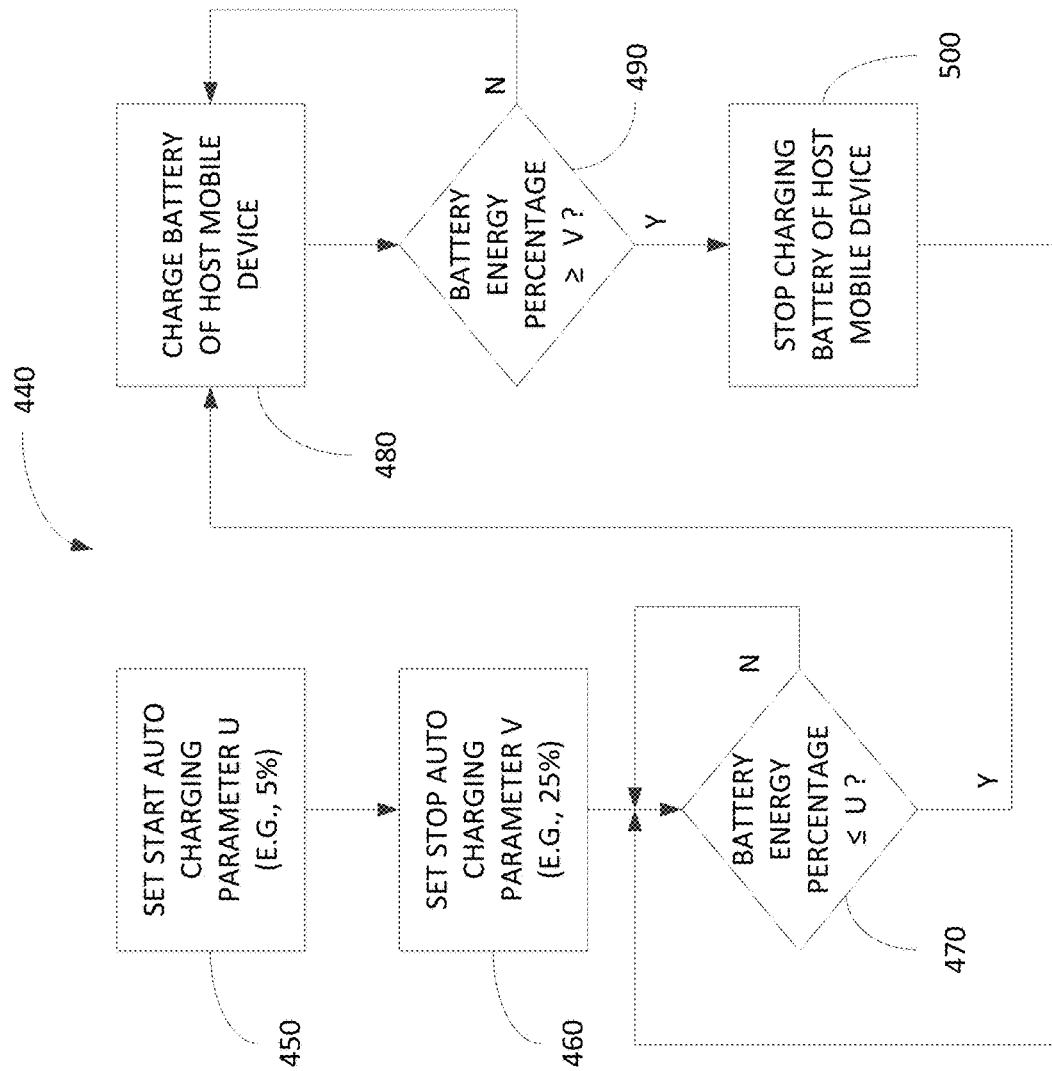
FIG. 9 shows a flowchart of a process for charging a battery of a host mobile device according to an exemplary embodiment of the present disclosure.

In some embodiments, the user can set auto charging parameters for the mobile device cover 100 to charge the host mobile device 110 based on battery energy percentages as shown in an exemplary flowchart in FIG. 9. Referring to FIG. 9, a user can manually set or automatically set (e.g., automatically set to preset or default values) a start auto charging parameter U (e.g., 5%) in step 450 and a stop auto charging parameter V (e.g., 25%) in step 460. Graphical or physical buttons can be provided to enter or incrementally increase or decrease the charging parameters, or to enter numerical values. The charging parameters are sent to the mobile device cover 100 (or the host mobile device 110) as a signal (e.g., a digital wireless or wired signal). In query 470, if the battery energy percentage of the host mobile device 110 is above 5%, then query 470 is repeated. In query 470, if the battery energy percentage of the battery of the host mobile device 110 drops to or below 5%, then the battery 170 of the mobile device cover 100 automatically charges the battery of the host mobile device 110 in step 480. In query 490, if the battery energy percentage of the battery of the host mobile device 110 is less than 25%, then the battery 170 of the mobile device cover 100 automatically charges the battery of the host mobile device 110 in step 480. In query 490, if the battery energy percentage of the battery of the host mobile device 110 reaches or exceeds 25%, then the charging of the battery of the host mobile device 110 automatically stops in step 500. The process 440 returns to query 470, and the charging of the battery of the host mobile device 110 does not automatically start again in step 480 until the battery energy percentage of the battery of host mobile device 110 reaches or drops below 5%. Thus, the user is managing the relative battery energy of one battery with respect to the other, or the distribution of total battery energy between the two batteries.

A similar process is also contemplated by some embodiments for charging the battery 170 of the mobile device cover 100 instead of the battery of the host mobile device 100 as in FIG. 9. Some embodiments contemplate implementing processes for charging one or both of the battery of the host mobile device 110 and the battery 170 of the mobile device cover 100 according to battery energy percentages, for example.

Figure 10:
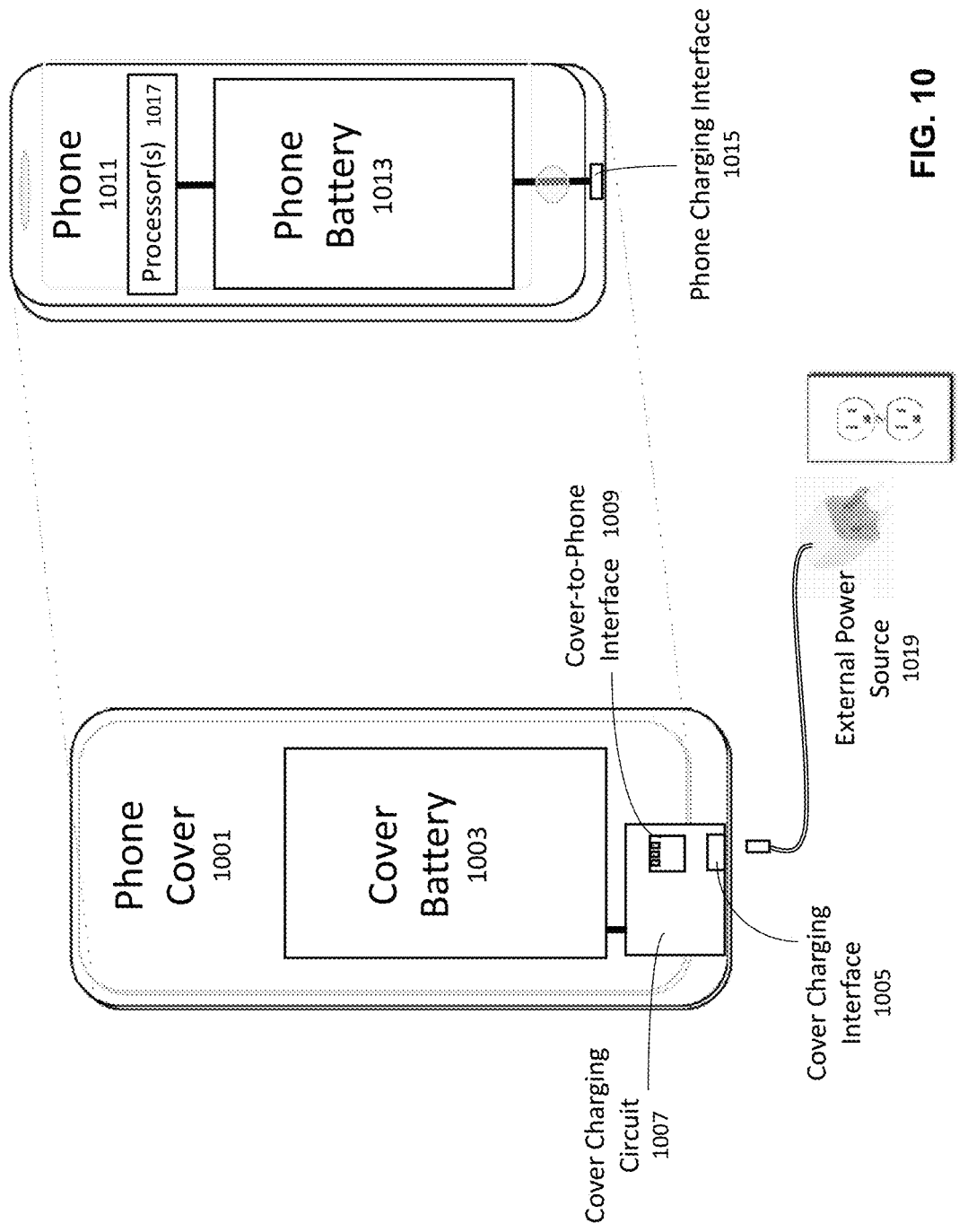
FIG. 10 shows a mobile device cover and a mobile device according to an exemplary embodiment of the present disclosure.

FIG. 10 shows a mobile device/phone cover 1001 and a mobile device/phone 1011 according to an exemplary embodiment of the present disclosure. The mobile phone cover 1001 may be positioned around the mobile phone 1011 to provide protection as well as a battery backup.

The mobile phone cover 1001 may comprise a battery 1003, one or more processors (not shown), a charging interface 1005, a charging circuit 1007, and an interface 1009 for coupling to the mobile phone 1011. The mobile device/phone 1011 may comprise a battery 1013, a charging interface 1015, a charging circuit (not shown) and one or more processors 1017.

The charging interface 1005 of the cover 1001 may be selectively and operably coupled, via the cover charging circuit 1007, to an external power source 1019, the cover battery 1003, and the mobile phone battery 1013. The cover charging circuit 1007 may also operably couple the mobile phone battery 1013 to the cover battery 1003.

Figure 11:
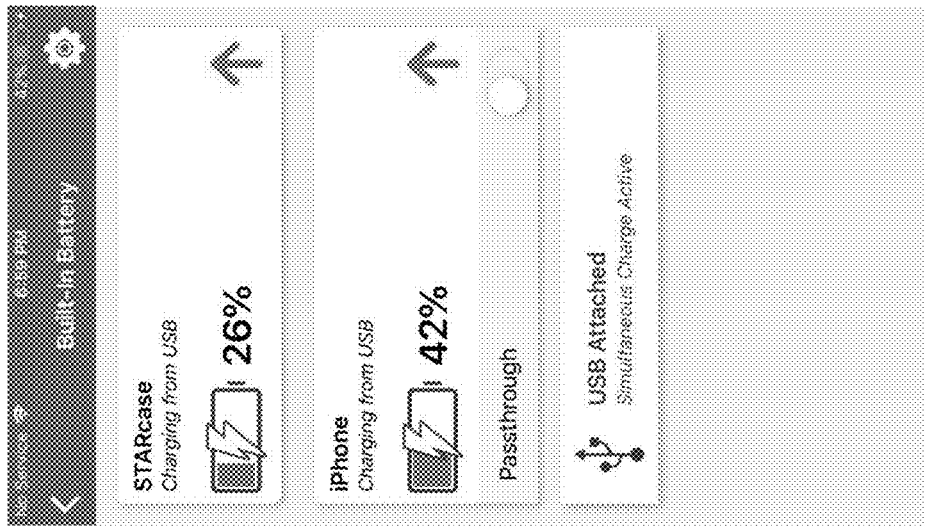
FIG. 11 shows an exemplary battery charging page of a mobile application according to an exemplary embodiment of the present disclosure.

The one or more processors 1017 may selectively couple the cover battery 1003 to the charging interface 1005 according to a passthrough charging parameter. For example, the one or more processors 1017 may be configured to provide a user interface as shown in the exemplary battery charging page of FIG. 11. The passthrough charging parameter selection may be via a graphical user interface as illustrated in FIG. 11. Alternatively, the passthrough charging parameter may be selected via the mobile phone cover. For example, a user may activate the cover charging circuit 1007 via the mobile phone cover without accessing the mobile phone or any mobile application.

Turning back to FIG. 10. When the passthrough charging parameter is selected, the mobile phone battery 1013 is operably coupled to the charging interface 1005 and the cover battery 1003 is decoupled from the charging interface. When the passthrough charging parameter is deselected, the mobile phone battery 1013 and the cover battery 1003 are both operably coupled to the charging interface 1005.

The one or more processors 1017 or cover charging circuit 1007 may be configured to generate a warning if a flow of charge to the charging interface is below a threshold. If the mobile phone battery 1013 and the cover battery 1003 are both operably coupled to the external power source 1019 via the charging interface 1005, the charging capability of the external power source 1019 may be split between the mobile phone battery 1013 and the cover battery 1003. A threshold of 2 amps, for example, may be set such that a warning is triggered if the external power source 1019 is unable to supply 2 amps. This warning may be an audible and/or visual warning on the mobile phone 1011 and/or the mobile phone cover 1001.

Figure 12:
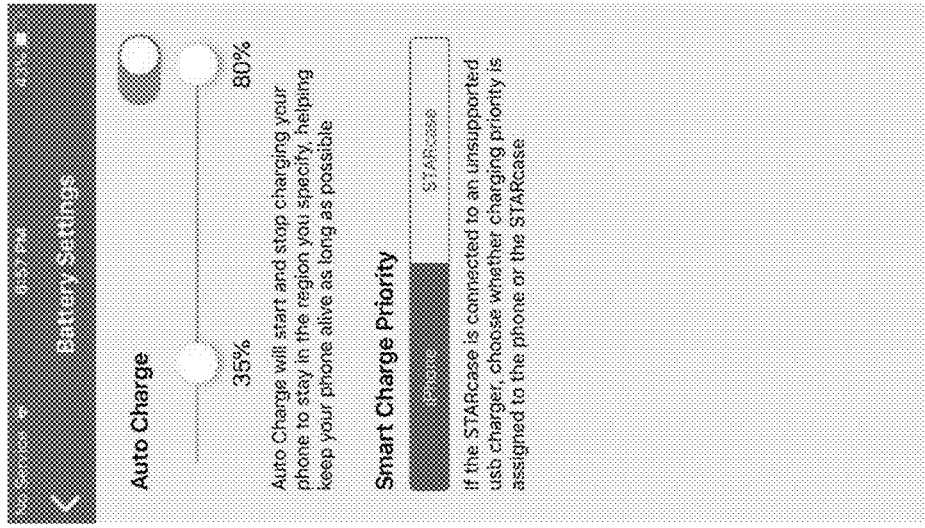
FIG. 12 shows an exemplary battery settings page of a mobile application according to an exemplary embodiment of the present disclosure.

The one or more processors 1017 or cover charging circuit 1007 may be configured to prioritize between charging the mobile phone battery 1013 or the cover battery 1003 according to the flow of charge (e.g., amperage) to the charging interface 1005 being below a threshold. This prioritization may be selectable as shown in FIG. 12. The illustrated "Smart Charge Priority" on the exemplary battery settings page of FIG. 12 shows that either the mobile phone battery 1013 or the cover battery 1003 may be selected, via a graphical user interface, to be charged first.

Other embodiments of the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A mobile phone, comprising:
one or more processors configured to selectively couple a battery of a mobile phone cover to a charging interface according to a passthrough charging parameter, wherein the one or more processors are configured to generate a warning if a flow of charge to the charging interface is below a threshold.

2. The mobile phone according to claim 1, wherein the mobile phone cover comprises the charging interface.

3. The mobile phone according to claim 1, wherein the charging interface is configured to be operably coupled to an external power source.

4. The mobile phone according to claim 1, wherein the charging interface is configured to be operably coupled to a battery of the mobile phone, and wherein the charging interface is external to the mobile phone.

5. The mobile phone according to claim 1, wherein a battery of the mobile phone is operably coupled to the battery of the mobile phone cover.

6. The mobile phone according to claim 1, wherein the one or more processors are configured to provide a user interface associated with the passthrough charging parameter.

7. The mobile phone according to claim 1, wherein when the passthrough charging parameter is selected, a battery of the mobile phone is operably coupled to the charging interface and the battery of the mobile phone cover is decoupled from the charging interface.

8. The mobile phone according to claim 1, wherein when the passthrough charging parameter is deselected, a battery of the mobile phone is operably coupled to the charging interface and the battery of the mobile phone cover is operably coupled to the charging interface.

9. The mobile phone according to claim 1, wherein when a flow of charge to the charging interface is below a threshold, the one or more processors are configured to prioritize one of charging the battery of the mobile phone cover and charging a battery of the mobile phone, wherein the prioritization is selectable.

10. A mobile phone cover, comprising:
a cover charging circuit; and
a cover battery, wherein:
the cover charging circuit is configured to selectively couple the cover battery to an external power source according to a passthrough charging parameter wherein the cover charging circuit is configured to indicate when a flow of charge from the external power source is below a threshold.

11. The mobile phone cover according to claim 10, wherein the mobile phone cover is positioned around a mobile phone.

12. The mobile phone cover according to claim 10, wherein the cover charging circuit is operably coupled to a charging interface of a mobile phone.

13. The mobile phone cover according to claim 10, wherein the cover charging circuit is configured to operably couple a mobile phone battery to the external power source.

14. The mobile phone cover according to claim 10, wherein the cover charging circuit is configured to operably couple the cover battery to a mobile phone battery.

15. The mobile phone cover according to claim 10, wherein the passthrough charging parameter is selected via a mobile phone.

16. The mobile phone cover according to claim 10, wherein when the passthrough charging parameter is selected, a mobile phone battery is operably coupled to the external power source and the cover battery is decoupled from the external power source.

17. The mobile phone cover according to claim 10, wherein when the passthrough charging parameter is deselected, a mobile phone battery is operably coupled to the external power source and the cover battery is operably coupled to the external power source.

18. The mobile phone cover according to claim 10, wherein when a flow of charge from the external power source is below a threshold, one of the cover battery and a mobile phone battery is selectively charged.

19. The mobile phone according to claim 1, wherein the passthrough charging parameter is selected via the mobile phone cover.

20. The mobile phone cover according to claim 10, wherein the passthrough charging parameter is selected via the mobile phone cover.

21. A non-transitory computer-readable storage medium comprising instructions stored thereon that, when executed by a processor of a mobile phone, cause the mobile phone to at least display a mobile application, the mobile application comprising:
a user interface configured to selectively couple a battery of a mobile phone cover to a charging interface according to a passthrough charging parameter, wherein the mobile application is configured to generate a warning if a flow of charge to the charging interface is below a threshold.

22. The mobile application according to claim 21, wherein the mobile phone cover comprises the charging interface.

23. The mobile application according to claim 21, wherein the charging interface is configured to be operably coupled to an external power source.

24. The mobile application according to claim 21, wherein the charging interface is configured to be operably coupled to a battery of the mobile phone, and wherein the charging interface is external to the mobile phone.

25. The mobile application according to claim 21, wherein a battery of the mobile phone is operably coupled to the battery of the mobile phone cover.

26. The mobile application according to claim 21, wherein when the passthrough charging parameter is selected, a battery of the mobile phone is operably coupled to the charging interface and the battery of the mobile phone cover is decoupled from the charging interface.

27. The mobile application according to claim 21, wherein when the passthrough charging parameter is deselected, a battery of the mobile phone is operably coupled to the charging interface and the battery of the mobile phone cover is operably coupled to the charging interface.

28. The mobile application according to claim 21, wherein when a flow of charge to the charging interface is below a threshold, the mobile application is configured to prioritize one of charging the battery of the mobile phone cover and charging a battery of the mobile phone, wherein the prioritization is selectable.

29. The mobile phone cover according to claim 21, wherein the passthrough charging parameter is selected via the mobile phone cover.

30. A mobile phone, comprising:
one or more processors configured to selectively couple a battery of a mobile phone cover to a charging interface according to a passthrough charging parameter, wherein when a flow of charge to the charging interface is below a threshold, the one or more processors are configured to prioritize one of charging the battery of the mobile phone cover and charging a battery of the mobile phone, wherein the prioritization is selectable.

31. The mobile phone according to claim 30, wherein the mobile phone cover comprises the charging interface.

32. The mobile phone according to claim 30, wherein the charging interface is configured to be operably coupled to an external power source.

33. The mobile phone according to claim 30, wherein the charging interface is configured to be operably coupled to a battery of the mobile phone, and wherein the charging interface is external to the mobile phone.

34. The mobile phone according to claim 30, wherein a battery of the mobile phone is operably coupled to the battery of the mobile phone cover.

35. The mobile phone according to claim 30, wherein the one or more processors are configured to provide a user interface associated with the passthrough charging parameter.

36. The mobile phone according to claim 30, wherein when the passthrough charging parameter is selected, a battery of the mobile phone is operably coupled to the charging interface and the battery of the mobile phone cover is decoupled from the charging interface.

37. The mobile phone according to claim 30, wherein when the passthrough charging parameter is deselected, a battery of the mobile phone is operably coupled to the charging interface and the battery of the mobile phone cover is operably coupled to the charging interface.

38. The mobile phone according to claim 30, wherein the passthrough charging parameter is selected via the mobile phone cover.

39. A mobile phone cover, comprising:
a cover charging circuit; and
a cover battery, wherein:
the cover charging circuit is configured to selectively couple the cover battery to an external power source according to a passthrough charging parameter, wherein when a flow of charge from the external power source is below a threshold, one of the cover battery and a mobile phone battery is selectively charged.

40. The mobile phone cover according to claim 39, wherein the mobile phone cover is positioned around a mobile phone.

41. The mobile phone cover according to claim 39, wherein the cover charging circuit is operably coupled to a charging interface of a mobile phone.

42. The mobile phone cover according to claim 39, wherein the cover charging circuit is configured to operably couple a mobile phone battery to the external power source.

43. The mobile phone cover according to claim 39, wherein the cover charging circuit is configured to operably couple the cover battery to a mobile phone battery.

44. The mobile phone cover according to claim 39, wherein the passthrough charging parameter is selected via a mobile phone.

45. The mobile phone cover according to claim 39, wherein when the passthrough charging parameter is selected, a mobile phone battery is operably coupled to the external power source and the cover battery is decoupled from the external power source.

46. The mobile phone cover according to claim 39, wherein when the passthrough charging parameter is deselected, a mobile phone battery is operably coupled to the external power source and the cover battery is operably coupled to the external power source.

47. The mobile phone cover according to claim 39, wherein the passthrough charging parameter is selected via the mobile phone cover.

48. A non-transitory computer-readable storage medium comprising instructions stored thereon that, when executed by a processor of a mobile phone, cause the mobile phone to at least display a mobile application, the mobile application comprising:
a user interface configured to selectively couple a battery of a mobile phone cover to a charging interface according to a passthrough charging parameter, wherein when a flow of charge to the charging interface is below a threshold, the mobile application is configured to prioritize one of charging the battery of the mobile phone cover and charging a battery of the mobile phone, wherein the prioritization is selectable.

49. The mobile application according to claim 48, wherein the mobile phone cover comprises the charging interface.

50. The mobile application according to claim 48, wherein the charging interface is configured to be operably coupled to an external power source.

51. The mobile application according to claim 48, wherein the charging interface is configured to be operably coupled to a battery of the mobile phone, and wherein the charging interface is external to the mobile phone.

52. The mobile application according to claim 48, wherein a battery of the mobile phone is operably coupled to the battery of the mobile phone cover.

53. The mobile application according to claim 48, wherein when the passthrough charging parameter is selected, a battery of the mobile phone is operably coupled to the charging interface and the battery of the mobile phone cover is decoupled from the charging interface.

54. The mobile application according to claim 48, wherein when the passthrough charging parameter is deselected, a battery of the mobile phone is operably coupled to the charging interface and the battery of the mobile phone cover is operably coupled to the charging interface.

55. The mobile phone cover according to claim 48, wherein the passthrough charging parameter is selected via the mobile phone cover.

56. A mobile phone, comprising:
one or more processors configured to selectively couple a battery of a mobile phone cover to a charging interface according to a passthrough charging parameter, wherein the passthrough charging parameter is selected via the mobile phone cover.

57. The mobile phone according to claim 56, wherein the mobile phone cover comprises the charging interface.

58. The mobile phone according to claim 56, wherein the charging interface is configured to be operably coupled to an external power source.

59. The mobile phone according to claim 56, wherein the charging interface is configured to be operably coupled to a battery of the mobile phone, and wherein the charging interface is external to the mobile phone.

60. The mobile phone according to claim 56, wherein a battery of the mobile phone is operably coupled to the battery of the mobile phone cover.

61. The mobile phone according to claim 56, wherein the one or more processors are configured to provide a user interface associated with the passthrough charging parameter.

62. The mobile phone according to claim 56, wherein when the passthrough charging parameter is selected, a battery of the mobile phone is operably coupled to the charging interface and the battery of the mobile phone cover is decoupled from the charging interface.

63. The mobile phone according to claim 56, wherein when the passthrough charging parameter is deselected, a battery of the mobile phone is operably coupled to the charging interface and the battery of the mobile phone cover is operably coupled to the charging interface.

64. A mobile phone cover, comprising:
a cover charging circuit; and
a cover battery, wherein:
the cover charging circuit is configured to selectively couple the cover battery to an external power source according to a passthrough charging parameter, wherein the passthrough charging parameter is selected via the mobile phone cover.

65. The mobile phone cover according to claim 64, wherein the mobile phone cover is positioned around a mobile phone.

66. The mobile phone cover according to claim 64, wherein the cover charging circuit is operably coupled to a charging interface of a mobile phone.

67. The mobile phone cover according to claim 64, wherein the cover charging circuit is configured to operably couple a mobile phone battery to the external power source.

68. The mobile phone cover according to claim 64, wherein the cover charging circuit is configured to operably couple the cover battery to a mobile phone battery.

69. The mobile phone cover according to claim 64, wherein the passthrough charging parameter is selected via a mobile phone.

70. The mobile phone cover according to claim 64, wherein when the passthrough charging parameter is selected, a mobile phone battery is operably coupled to the external power source and the cover battery is decoupled from the external power source.

71. The mobile phone cover according to claim 64, wherein when the passthrough charging parameter is deselected, a mobile phone battery is operably coupled to the external power source and the cover battery is operably coupled to the external power source.

72. A non-transitory computer-readable storage medium comprising instructions stored thereon that, when executed by a processor of a mobile phone, cause the mobile phone to at least display a mobile application, the mobile application comprising:
a user interface configured to selectively couple a battery of a mobile phone cover to a charging interface according to a passthrough charging parameter, wherein the passthrough charging parameter is selected via the mobile phone cover.

73. The mobile application according to claim 72, wherein the mobile phone cover comprises the charging interface.

74. The mobile application according to claim 72, wherein the charging interface is configured to be operably coupled to an external power source.

75. The mobile application according to claim 72, wherein the charging interface is configured to be operably coupled to a battery of the mobile phone, and wherein the charging interface is external to the mobile phone.

76. The mobile application according to claim 72, wherein a battery of the mobile phone is operably coupled to the battery of the mobile phone cover.

77. The mobile application according to claim 72, wherein when the passthrough charging parameter is selected, a battery of the mobile phone is operably coupled to the charging interface and the battery of the mobile phone cover is decoupled from the charging interface.

78. The mobile application according to claim 72, wherein when the passthrough charging parameter is deselected, a battery of the mobile phone is operably coupled to the charging interface and the battery of the mobile phone cover is operably coupled to the charging interface.

* * * * *